US012719713B2

(12) United States Patent
Matosevic et al.

(10) Patent No.: US 12,719,713 B2
(45) Date of Patent: Aug. 25, 2026

(54) NETWORK-ON-CHIP MULTICASTING WITH PACKET SPECIFIC EXCLUSION ENCODING

(71) Applicant: Tenstorrent USA, Inc., Austin, TX (US)

(72) Inventors: Ivan Matosevic, Toronto (CA); Derek Kwan, Toronto (CA); Bo Qin, Toronto (CA)

(73) Assignee: Tenstorrent USA, Inc.

( * ) Notice: Subject to any disclaimer, the term of this patent is extended or adjusted under 35 U.S.C. 154(b) by 46 days.

(21) Appl. No.: 18/908,896

(22) Filed: Oct. 8, 2024

(65) Prior Publication Data

US 2025/0286747 A1 Sep. 11, 2025

Related U.S. Application Data

(60) Provisional application No. 63/561,720, filed on Mar. 5, 2024.

(51) Int. Cl.

| | |
|---|---|
| ***H04L 12/18*** | (2006.01) |
| ***H04L 45/24*** | (2022.01) |
| ***H04L 45/745*** | (2022.01) |
| ***H04L 49/00*** | (2022.01) |
| ***H04L 49/109*** | (2022.01) |

(52) U.S. Cl.

CPC .......... *H04L 12/1886* (2013.01); *H04L 45/24* (2013.01); *H04L 45/745* (2013.01); *H04L 49/109* (2013.01); *H04L 49/3063* (2013.01)

(58) Field of Classification Search

CPC ... H04L 12/1886; H04L 45/24; H04L 45/745; H04L 49/109; H04L 49/3063; H04L 45/16

See application file for complete search history.

(56) References Cited

U.S. PATENT DOCUMENTS

| | | | | |
|---|---|---|---|---|
| 7,925,778 | B1 * | 4/2011 | Wijnands | H04L 45/04 370/392 |
| 10,432,757 | B1 * | 10/2019 | Sajassi | H04L 12/185 |
| 10,601,702 | B1 * | 3/2020 | Cruz | H04L 45/16 |
| 12,020,035 | B2 * | 6/2024 | Parle | G06F 9/3887 |
| 12,499,052 | B2 * | 12/2025 | Minkin | G06F 12/0207 |

(Continued)

FOREIGN PATENT DOCUMENTS

| | | |
|---|---|---|
| CN | 105007226 A | 10/2015 |

OTHER PUBLICATIONS

International Search Report and Written Opinion from International Application No. PCT/US25/18273 dated May 6, 2025, 15 pages.

(Continued)

*Primary Examiner* — Jimmy H Tran
(74) *Attorney, Agent, or Firm* — Daylight Law, P.C.

(57) ABSTRACT

Methods and systems are disclosed for transmitting multicast messages through a network-on-chip device. Compact descriptions of target addressed nodes in the network can be included with each message for efficient routing. Sets of nodes to be excluded from receiving the message for further processing can also be specified and transmitted with each message, adding minimal overhead yet providing for great flexibility in routing processing workloads to appropriate nodes.

25 Claims, 24 Drawing Sheets

(56) References Cited

U.S. PATENT DOCUMENTS

2004/0081155 A1* 4/2004 Bhanot .............. H05K 7/20836 370/392
2006/0104267 A1* 5/2006 Mondinelli ............. H04L 45/04 370/389
2007/0192451 A1* 8/2007 Tran .................... H04L 12/1836 709/223
2008/0164907 A1* 7/2008 Mercaldi-Kim ..... H03K 19/177 326/41
2009/0006808 A1* 1/2009 Blumrich .......... G06F 15/17337 712/12
2009/0070549 A1* 3/2009 Solomon ............... G06F 15/803 712/E9.001
2009/0259713 A1* 10/2009 Blumrich .............. G06F 17/142 714/E11.178
2010/0172351 A1* 7/2010 Fernandez .............. H04L 45/16 370/390
2010/0318703 A1* 12/2010 Zhu ....................... G06F 9/3854 710/305
2011/0022754 A1* 1/2011 Cidon ................. G06F 15/7825 710/107
2011/0317695 A1* 12/2011 Cai ......................... H04L 45/16 370/390
2013/0010648 A1* 1/2013 Tang ....................... H04L 45/02 370/254
2013/0159669 A1* 6/2013 Comparan ............ G06F 9/3851 712/E9.002
2014/0156929 A1* 6/2014 Falsafi ................ G06F 15/7825 711/122
2016/0261420 A1* 9/2016 Nguyen ................ H04L 63/107
2017/0063564 A1* 3/2017 Kumar .................... H04L 45/16
2017/0220499 A1* 8/2017 Gray ....................... G06F 13/36
2018/0181173 A1* 6/2018 Gangwar ................ G06F 1/324
2019/0007273 A1* 1/2019 Basant .................... H04L 45/06
2019/0288939 A1* 9/2019 Dong ...................... H04L 45/16
2019/0327168 A1* 10/2019 Eckert ..................... H04L 45/16
2020/0213217 A1* 7/2020 Nye ....................... G06N 3/084
2020/0213245 A1* 7/2020 Gray ....................... H04L 12/18
2020/0252333 A1* 8/2020 Mishra .................... H04L 45/16
2020/0401402 A1 12/2020 Capalija et al.
2021/0036877 A1* 2/2021 Klenk ..................... H04L 47/20
2021/0036881 A1* 2/2021 Klenk ..................... H04L 47/20
2021/0218587 A1* 7/2021 Mishra .................. H04L 12/185
2021/0281515 A1* 9/2021 Basavaraj ............. H04L 12/185
2021/0336883 A1* 10/2021 Pudiyapura ......... H04L 47/2441
2022/0201784 A1* 6/2022 Bartier .................. H04L 45/122
2022/0417177 A1 12/2022 Gray
2023/0133944 A1* 5/2023 Zhang ..................... H04L 45/14 370/390
2023/0289292 A1* 9/2023 Minkin ............... G06F 12/0207
2024/0137410 A1* 4/2024 Dearth ................ H04L 67/1008
2024/0289132 A1* 8/2024 Parle ......................... G06T 1/60
2025/0217187 A1* 7/2025 Abts ..................... G06F 15/173
2025/0315258 A1* 10/2025 Vasiljevic ............. G06F 9/3877
2026/0067202 A1* 3/2026 Wright .................... H04L 45/16

OTHER PUBLICATIONS

Lee et al. (2023). MRCN: Throughput-Oriented Multicast Routing for Customized Network-on-Chips. IEEE Transactions on Parallel and Distributed Systems, 34, 163-179.

* cited by examiner

NETWORK-ON-CHIP MULTICASTING WITH PACKET SPECIFIC EXCLUSION ENCODING

CROSS REFERENCE TO RELATED APPLICATIONS

This application claims the benefit of U.S. Provisional Patent Application No. 63/561,720, filed Mar. 5, 2024, which is incorporated by reference herein in its entirety for all purposes.

BACKGROUND

Many computing systems that are directed to accelerating artificial intelligence workloads, such as the execution of an artificial neural network (ANN), use the paradigm of distributed parallel computing embodied by, for example, a multicore processor. More generally, these systems can be referred to as a network of computational nodes. In a multicore processor, collaboration among multiple cores is essential for efficiently executing ANNs. The parallel architecture of multicore processors allows for simultaneous processing of different portions of the ANN, significantly speeding up training and inference tasks. During the execution of an ANN, various layers and operations can be divided among the available cores, enabling concurrent computation and reducing overall processing time. The cores collaborate through efficient communication mechanisms, such as Networks-on-Chips (NoCs). Coordinated data sharing and synchronization mechanisms are implemented to ensure that intermediate results are exchanged seamlessly, enabling the collective execution of complex neural network models. This collaborative approach optimizes the utilization of available computational resources, enhances parallelism, and contributes to the overall acceleration of AI workloads on multicore processors.

However, despite the advantages of parallelism in multicore processors for ANN execution, efficient data sharing among cores presents a significant challenge. Coordinating the flow of data, particularly data associated with large quantities of network data and intermediate results in the form of activation data, requires careful consideration of communication overhead and synchronization. The interconnectedness of processing cores in a multicore system demands sophisticated communication architectures, like NoCs, to manage the exchange of information without introducing bottlenecks. Balancing the distribution of tasks across cores and minimizing data movement latency is crucial for achieving optimal performance. Maximizing the productive usage of cores of multicore processors without excessive messaging and processing overhead is also critical to maintaining efficient utilization of multicore processors. Therefore, addressing the complexities of data sharing and propagation becomes a critical aspect in the design and optimization of multicore processors for executing neural networks.

SUMMARY

This disclosure relates to networks of computational nodes for the execution of workloads, particularly for artificial intelligence applications. A network of computational nodes such as a NoC may include numerous processing cores in a multicore processor. To facilitate the efficient distribution of workloads, control of cores, and access to processed outputs, some communications within the network may be transmitted as multicast messages. For example, an origin or source node may communicate a message to multiple destination nodes within the network via a single multicast message that is distributed to all the target nodes. Utilizing a multicast message avoids sending multiple messages over a shared communication path and provides for scalability in multi-core processing of complex workloads. Compact and efficient addressing techniques are utilized, such as addressing the recipient nodes by reference to locations within a grid of nodes that forms the network rather than individual node addresses. Messages are then propagated through the network to each of the recipient nodes via parallel distribution paths, such that each communication link between adjacent nodes only transmits the multicast message once and such that the total number of transmissions necessary to propagate the multicast message to all the recipient nodes is minimized.

In specific embodiments of the invention, a network of computational nodes is connected so that nodes are connected to each other and are physically or logically addressable. Various shapes of network topology can be chosen, and they can be organized as an addressable grid. Messages can also contain header information about addressed nodes where a message should be sent. In addition, messages can also include one or more exclusion zones, where some nodes in the set of address nodes are excluded from needing to process the payload of the message. In specific embodiments, the message may not need to be propagated through the excluded nodes or may be propagated through them to improve overall network efficiency and routing.

Approaches disclosed herein describe various types of grids, but examples include rectangular grids of computational nodes that are connected so that the addresses wrap around the edges (e.g., the nodes are connected with a toroidal topology). Addressed nodes can also be a rectangular subset of the node network. Excluded nodes within the address nodes can be described using various compact methods. In one case, rows and/or columns can be skipped for exclusion based on criteria describing a "strided" exclusion address. In another case, excluded nodes can be an arbitrary quadrant of the addressed nodes extending to a corner of the address nodes, describing a "quadrant" exclusion address. In another case, excluded nodes can be a smaller subset rectangle with an arbitrary position within the addressed nodes. In all of these cases, compact address and exclusion criteria can be sent with each message. Furthermore, routing of a multicast message can be optimized using propagation logic, where messages will not be routed through a node if the only destination nodes along a route lead to excluded nodes.

In specific embodiments of the invention, a method for multicasting within a network-on-chip is provided. The method comprises: receiving a multicast message at a first node of a network of nodes, wherein the multicast message includes a definition of one or more addressed nodes and one or more exclusion criteria; propagating, via the first node, the multicast message to at least a first subset of the addressed nodes; and processing the multicast message at each node of the first subset of the addressed nodes, wherein a second subset of the addressed nodes that does not process the multicast message is determined by the one or more exclusion criteria.

In specific embodiments of the invention, a network-on-chip system is provided. The system comprises: a network of computational nodes, each comprising a network interface unit (NIU) and a processing core; and communication paths between each computational node and a plurality of other computational nodes in the network; wherein the nodes are configured to (i) receive a multicast message containing a definition of one or more addressed nodes and one or more exclusion criteria; (ii) propagate the multicast message to at least a first subset of the addressed nodes through the connection paths; and (iii) process the multicast message at each node of the first subset of the addressed nodes; and wherein a second subset of the addressed nodes that does not process the multicast message is determined by the one or more exclusion criteria.

In specific embodiments of the invention, a method for multicasting within a network-on-chip is provided. The method comprises: generating a multicast message at an origin node of a network of nodes, wherein the multicast message includes definitions of destination nodes for the multicast message; identifying addressed nodes from the definitions of destination nodes to determine message routing propagation, wherein the definitions include a location range for the addressed nodes and one or more exclusion criteria; propagating the multicast message to a receiving node of a network of nodes, wherein the receiving node is communicatively connected to one of the addressed nodes; propagating, via the receiving node, the multicast message to at least a first subset of the addressed nodes; and processing the multicast message at each node of the first subset of the addressed nodes, wherein a second subset of the addressed nodes that does not process the multicast message is determined by the one or more exclusion criteria.

BRIEF DESCRIPTION OF THE DRAWINGS

The accompanying drawings illustrate various embodiments of systems, methods, and various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DESCRIPTION

Figure 1:
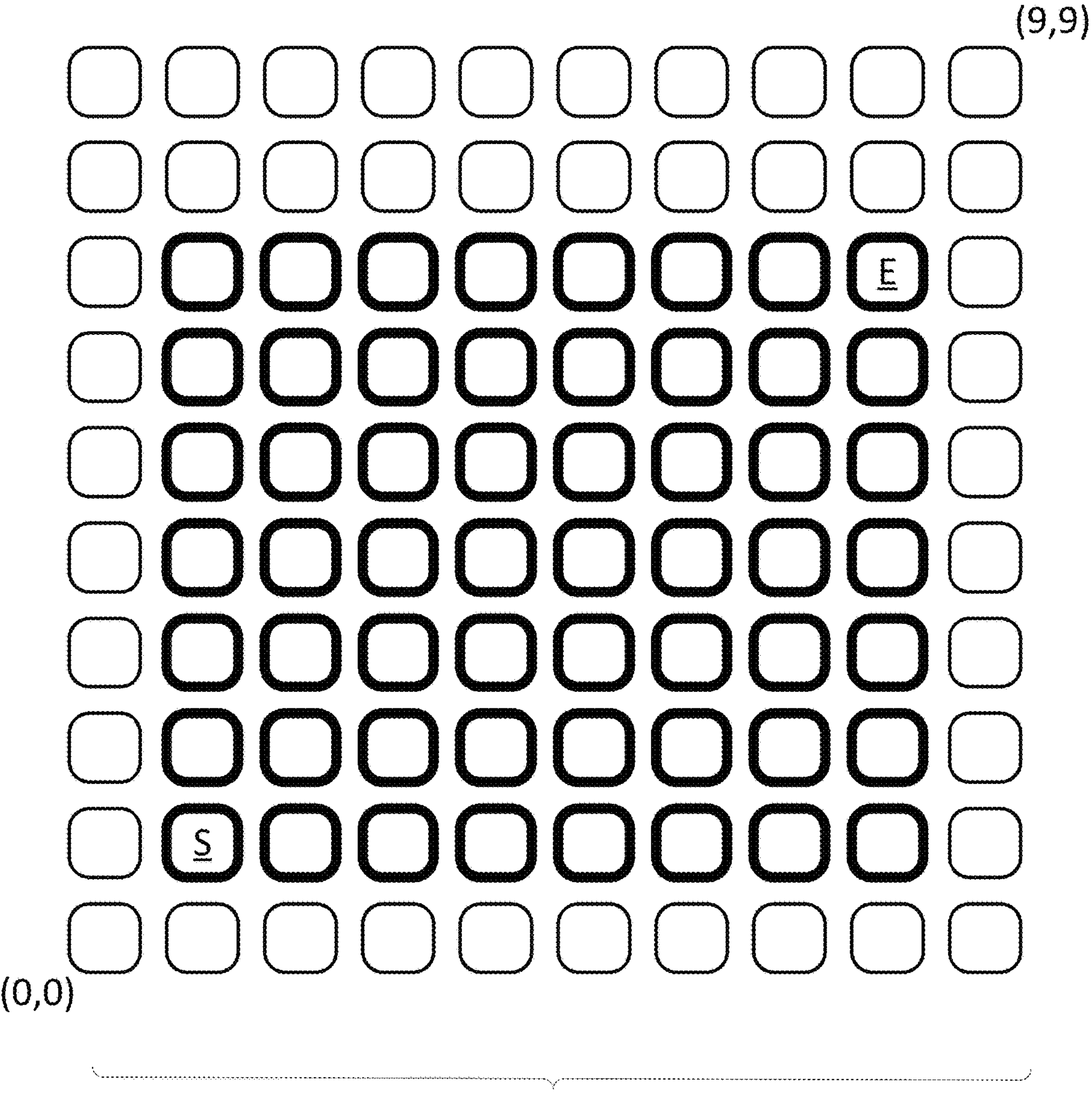
FIGS. 1 and 2 show examples of addressed nodes in a network of computational nodes in accordance with specific embodiments of the inventions disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods for multicast communication among nodes in accordance with the summary above are described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Systems and methods related to networks of computational nodes for the execution of artificial intelligence workloads are disclosed herein. In specific embodiments, a network of computational nodes (e.g., "nodes") such as a NoC includes numerous processing cores (e.g., "cores") in a multicore processor. To facilitate the efficient distribution of workloads, control of cores, and access to processed outputs, some communications within the network may be transmitted as multicast messages. For example, an origin or source node may communicate a message to multiple destination nodes within the network via a single multicast message that is distributed to all the target nodes. Utilizing a multicast message avoids sending multiple messages over a shared communication path and provides for scalability in multicore processing of complex workloads. Compact and efficient addressing techniques are utilized, such as addressing the recipient nodes by reference to locations within a grid of nodes that forms the network rather than individual node addresses. Messages are then propagated through the network to each of the recipient nodes via parallel distribution paths, such that each communication link between adjacent nodes only transmits the multicast message once and such that the total number of transmissions necessary to propagate the multicast message to all the recipient nodes is minimized. In some cases, the message may be generated in an origin node and propagated through the network to a source node before being further propagated to addressed nodes. This may occur when the message origin node is not directly communicatively connected to an addressed node for sending messages.

Although multicast messages and the addressing and message propagation techniques described herein may be utilized and may be transmitted according to a variety of methods, multicast message packets within a network of nodes may be transmitted via flow control digits or "FLITs," which in turn may be header FLITs, payload FLITs, and tail FLITs. A header FLIT includes addressing information for a set of addressed nodes such as a start coordinate and end coordinate corresponding to locations of a grid of nodes within the network. Start-end addressing provides flexibility for selecting addressed nodes within the network, for example, as any suitable rectangular (e.g., including square) shaped set of addressed nodes within an x-y addressable network, including "wrapping" around the network (e.g., from a start coordinate at a higher-numbered coordinate than an end coordinate).

The addressing information for a multicast message (e.g., within a header FLIT) includes exclusion criteria that enable substantial flexibility in the addressing of nodes and their associated cores. In addition to the addressing information that defines the addressed nodes (e.g., a rectangular grid within the network), the multicast message includes the exclusion criteria which exclude a subset of the addressed nodes from processing of the multicast message. In some implementations, the multicast message is not provided to some or all of the excluded nodes at all, reducing the overall use of bandwidth in the network and reducing the processing required by the excluded nodes, since components such as a network interface unit ("NIU") of the excluded nodes need not handle the multicast message. Depending on the source of the multicast message and the locations of the non-excluded addressed nodes, an excluded node may provide the most efficient path to distribute the multicast message to one or more non-excluded addressed nodes, in which case the NIU may process and forward the multicast message but does not provide the message to its associated processing core for processing.

Examples of exclusion criteria include "strided" exclusion criteria and "quadrant" exclusion criteria. The exclusion criteria may be optimized to provide for significant control over the selection of excluded cores with minimal addressing overhead. For example, in a network of nodes with addressed nodes in a rectangular grid, a strided exclusion criteria may define consecutive nodes in rows and columns within the sub-grid of addressed nodes to be excluded. The strided exclusion criteria may define the rows and columns to be excluded not by row number and column number, which could require specific identification of an indeterminate number of rows, but rather, with a repeatable pattern that can be defined with a set number of bits (e.g., 4 total bits for excluded rows and 4 total bits for excluded columns). As another example, in a network of nodes with addressed nodes in a rectangular grid, quadrant exclusion criteria may define a rectangular sub-grid for exclusion within the rectangular grid of addressed nodes. An example quadrant exclusion criteria may efficiently define the sub-grid based on an exclusion coordinate (e.g., an x-y coordinate within the grid of addressed nodes) and exclude directions (e.g., positive or negative x-direction and y-direction for exclusion, to include each "corner" of the rectangular grid of addressed nodes as a possibility for excluded nodes). Additional exclusion criteria may include routing optimization and enable bits, with routing optimization providing for reduced propagation of messages via excluded nodes.

FIG. 1 depicts addressed nodes (in bold) within a network 100 of computational nodes. Although a network of computational nodes can have a variety of sizes and configurations (e.g., rectangular, circular, polygon, etc.), network 100 is a rectangular (e.g., square) network of 100 nodes. Further, the particular depicted network shapes, node locations, and relative sizes are representative of the architecture of the network, e.g., with each node being capable of communicating (communications paths not depicted in FIG. 1) with four adjacent nodes and nodes at one "side" of the network being capable of communicating with adjacent nodes at the other "side" of the network (e.g., node (0,5) can communicate with node (9,5) and node (5,0) can communicate with node (5,9), and vice versa). The nodes within the network are addressable by reference to their location within a grid defined by network 100, with the lowest address within the address space for the network 100 having the x-y coordinates of (0,0) at the lower left corner of the grid of network 100 and the highest address within the address space for the network 100 having the x-y coordinates of (9,9) at the upper right corner of the of the grid of network 100. For clarity, a coordinate of (x,y) represents a node in column x and in the row y.

Figure 2:
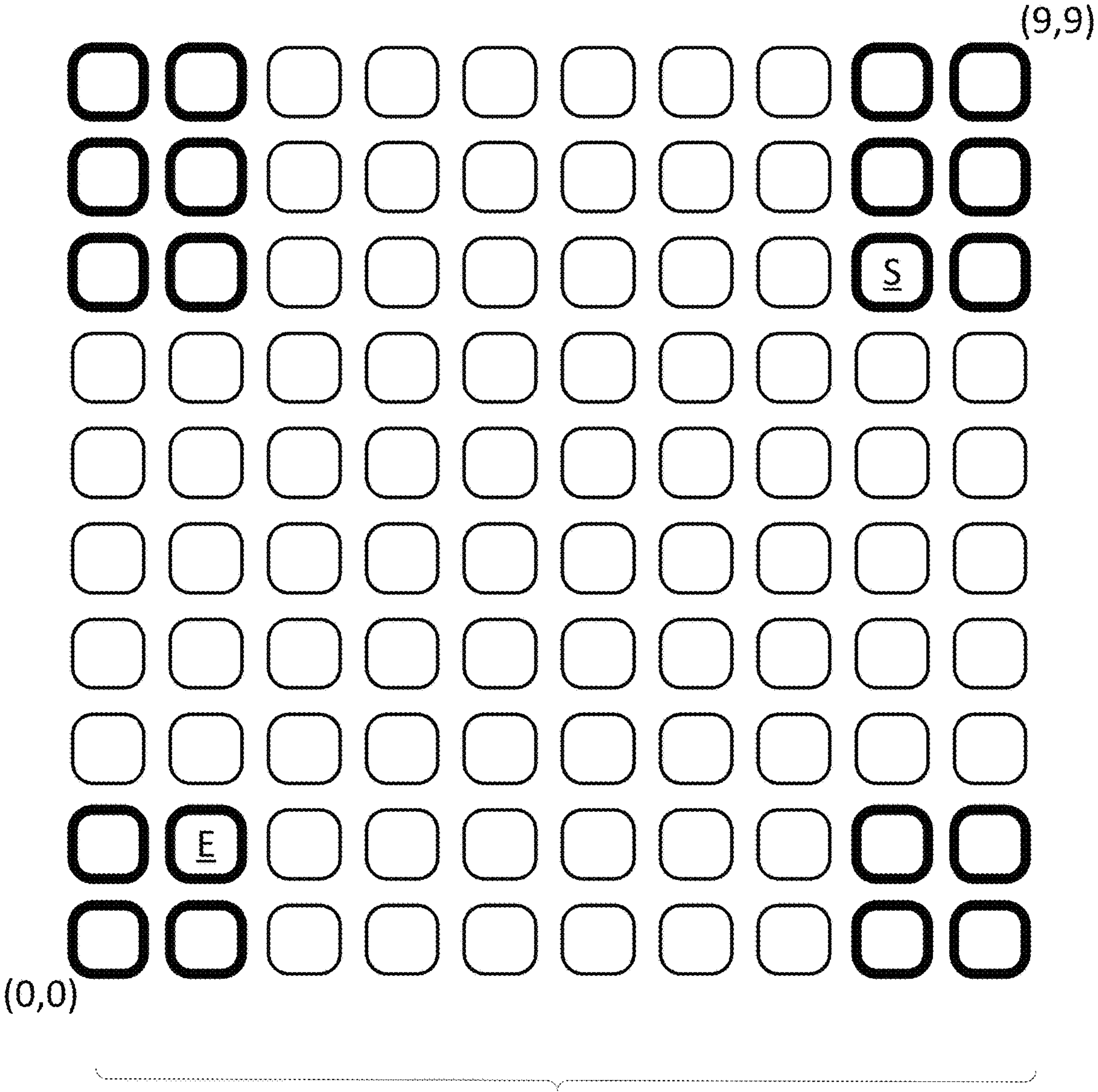

A multicast message can address nodes within the network 100 in a variety of manners, including by reference to a start node and end node. In FIG. 1, the start node, hereinafter labeled S, is node (1,1) while the end node, hereinafter labeled E, is node (8,7), with the total size of the grid of addressed nodes being 56 nodes. The start node and end node can be any two nodes, including the same node (e.g., addressed to a single node), providing for a large number of potential options of grids of addressed nodes having rectangular shapes. The propagation direction of addressing from the start to the end node is arbitrary, and can be selected based on the network and node topology. Addressed nodes are depicted in this and subsequent figures with a bold outline. Further, as depicted in FIG. 2, if the start node has a higher address than the end node for either the row or column field, the grid of the addressed nodes wraps around the network 100. In FIG. 2, the location of the start node and the end node have been switched, such that the start node is node (8,7) and the end node is node (1,1). Thus, the addressed nodes continue from node (8,7) until each of the row and column corresponds to the end node (1,1), as depicted by the bold outline nodes in FIG. 2.

Figure 3:
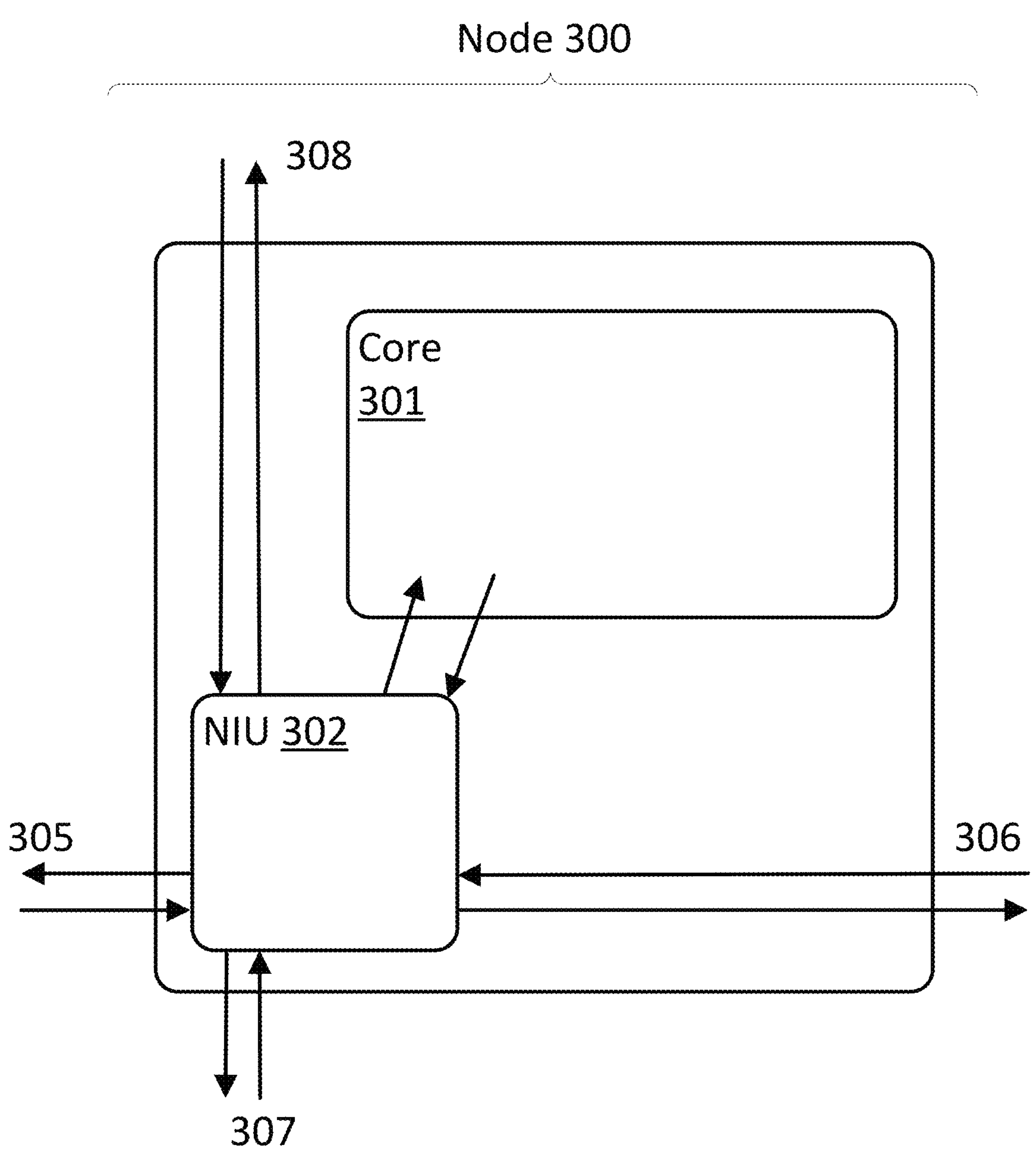
FIG. 3 shows an example of a computational node in accordance with specific embodiments of the inventions disclosed herein.

FIG. 3 depicts an exemplary node 300 of a network of computational nodes. The depiction of FIG. 3 is exemplary only and is simplified for purposes of this disclosure. It will be understood that a node of a network of computational nodes can have a variety of configurations and components, including processing, memory, and number and types of communication paths. The node 300 depicted in FIG. 3 includes an NIU 302 and a processing core 301, as well as communication paths 305, 306, 307, and 308 for communicating with each of four adjacent nodes. When the NIU 302 receives a multicast message via one of the communication paths 305-308 it determines how to handle the multicast message based on the content of the multicast message (e.g., of a header FLIT) and logic of the NIU 302, for example, whether to forward the message to an adjacent node for further propagation and whether to provide the multicast message (e.g., associated payload FLIT) to the core 301. In the context of multicast messages that include an address definition such as start node and end node addresses, the NIU 302 determines whether its core 301 is one of the addressed nodes to potentially provide the multicast message to the core 301, assuming the node 300 is not an excluded addressed node as described herein. The logic can determine if the node is within the address definition specified by a start node and an end node and determine if any exclusion criteria apply to the node such that the message should not be provided to the core. The NIU 302 also determines whether to propagate the message to one or more adjacent nodes based on propagation logic. An example propagation logic is to propagate towards the upper right corner of the grid of the network by distributing the multicast message upward through a single column and to the right through multiple rows of the addressed nodes, although it will be understood that other propagation rules and logic may be utilized.

The NIU 302 also analyzes exclusion logic to determine whether it should provide the multicast message to its associated core 301 and/or further propagate the message along one or more of the paths 305-308. As an example, the node 300 may be an addressed node based on a start node and end node addressing definition, but the exclusion criteria may nonetheless exclude the node based on the row or column of the node (e.g., based on striding exclusion criteria) or if the node 300 is within a quadrant of excluded nodes (e.g., based on quadrant exclusion criteria). The multicast message is not provided to the core 301, allowing the core 301 to continue with other processing tasks. The NIU 302 also determines whether it should forward the multicast message to other nodes. For example, the multicast message may be received from one of communication paths 305 or 307, but the exclusion criteria may indicate that an adjacent addressed node (e.g., via communication path 306) is an excluded node, and that routing optimization allows the transmission to the excluded node to be skipped (e.g., based on the excluded node not being a required path for propagating the multicast to a non-excluded addressed node). NIU 302 need not further transmit the multicast message, saving network bandwidth and avoiding unnecessary processing steps by other nodes. Communication paths 305-308 can be bidirectional as shown, but in some configurations, they may be implemented as unidirectional in a desired propagation direction.

Figure 4:
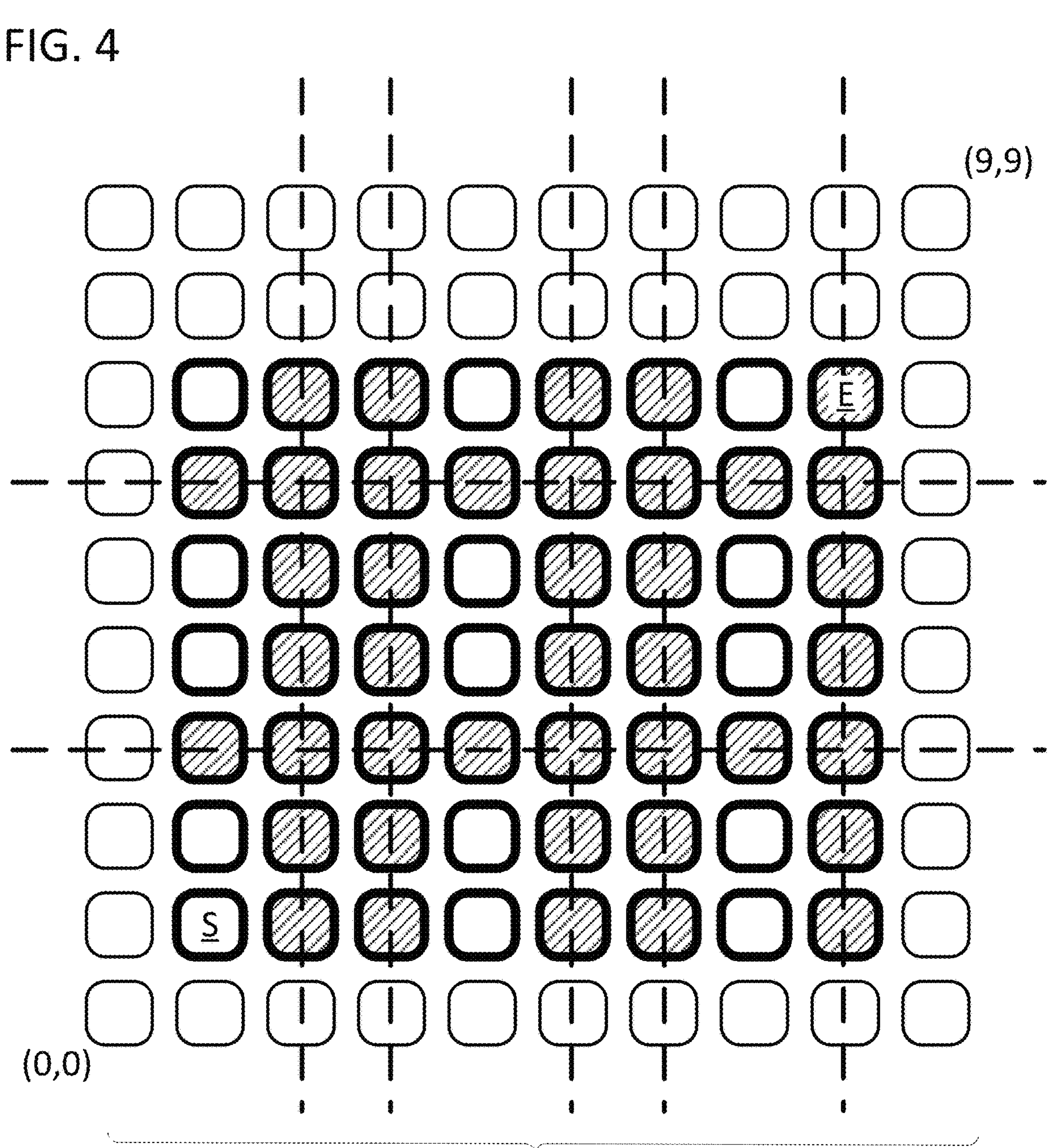
FIGS. 4 and 5 show examples of addressed nodes in a network of computational nodes with strided exclusion in accordance with specific embodiments of the inventions disclosed herein.

FIG. 4 depicts exemplary strided node exclusion in accordance with an embodiment of the present disclosure. Network 400 includes an addressed grid beginning at start node (1,1) and ending at end node (8,7), such that the grid of addressed nodes includes all of the nodes bounded by the rectangular region defined by node (1,1), node (1,7), node (8,1), and node (8,7). Excluded nodes within the grid of addressed nodes are depicted as cross-hatched, with the excluded rows depicted with dashed lines at rows 3 and 6 and excluded columns depicted by dashed lines at columns 2, 3, 5, 6, and 8. Although the definition of the excluded rows and columns may be provided in a variety of manners, in an exemplary embodiment excluded columns may be defined by x-axis "keep" and "skip" exclusion criteria and excluded rows may be defined by y-axis "keep" and "skip" criteria. Keep criteria indicates the number of rows or columns to keep, starting with the row or column of the start node, while the skip criteria indicate the number of rows or columns to exclude after the keep rows or columns, with the keep and skip pattern continuing until the end node is reached. A skip value of "0" indicates that no rows (e.g., zero as the y-axis skip value) or no columns (e.g., zero as the x-axis skip value) are to be excluded. In the example of FIG. 4, the keep and skip values are as follows:

$$\text{STRIDED\_KEEP\_X}[1:0] = 1$$

$$\text{STRIDED\_SKIP\_X}[1:0] = 2$$

$$\text{STRIDED\_KEEP\_Y}[1:0] = 2$$

$$\text{STRIDED\_SKIP\_Y}[1:0] = 1$$

As is depicted in FIG. 4, the first column of the addressed grid (column 1) is not excluded based on the x-axis keep value of 1, while the next two columns (columns 2 and 3) are excluded based on the x-axis skip value of 2, with the pattern repeating through columns 4-8. The first two rows of the addressed grid (rows 1 and 2) are not excluded based on the y-axis keep value of 2, while the next row (row 3) is excluded based on the y-axis skip value of 1, with the pattern repeating through rows 4-7. Excluded nodes may forward the message to other nodes within the grid (including via non-addressed nodes as necessary) but do not provide the multicast message to the excluded node's core.

Figure 5:
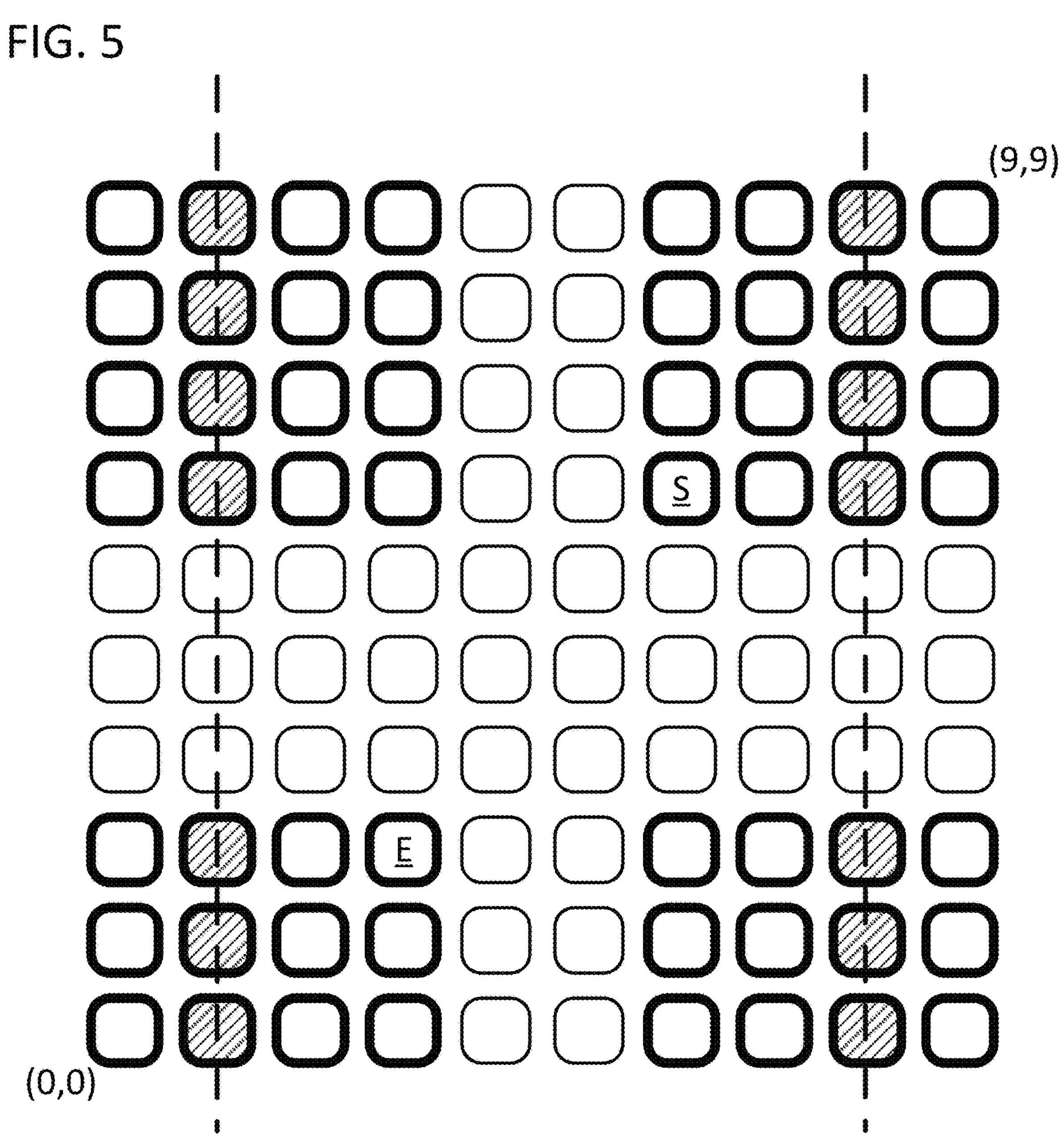

FIG. 5 depicts exemplary strided node exclusion with a zero skip value for the rows of the grid, in accordance with an embodiment of the present disclosure. Network 500 includes an addressed grid beginning at start node (6,6) and wrapping across the network 500 to end node (3,2) such that the grid of addressed nodes includes all of the nodes bounded by the rectangular region defined by node (6,6), (6,2), (3,6), and (3,2). Excluded nodes within the grid of addressed nodes are depicted cross-hatched, with no excluded rows and the excluded columns depicted by dashed lines at columns 1 and 8. In the example of FIG. 4, the keep and skip values are as follows:

$$\text{STRIDED\_KEEP\_X}[1:0] = 2$$

$$\text{STRIDED\_SKIP\_X}[1:0] = 1$$

$$\text{STRIDED\_KEEP\_Y}[1:0] = 3$$

$$\text{STRIDED\_SKIP\_Y}[1:0] = 0$$

As is depicted in FIG. 5, the first two columns of the addressed grid (columns 6 and 7) are not excluded based on the x-axis keep value of 2, while the next column (column 8) is excluded based on the x-axis skip value of 1, with the pattern repeating through columns 9-3. None of the rows are excluded based on the y-axis skip value being zero. By requiring only the skip value to be zero to avoid skipping nodes, processing for generating messages is reduced, since the keep value does not also need to be changed. Excluded nodes may forward the message to other nodes within the grid (including via non-addressed nodes as necessary) but do not provide the multicast message to the excluded node's core.

Figure 6:
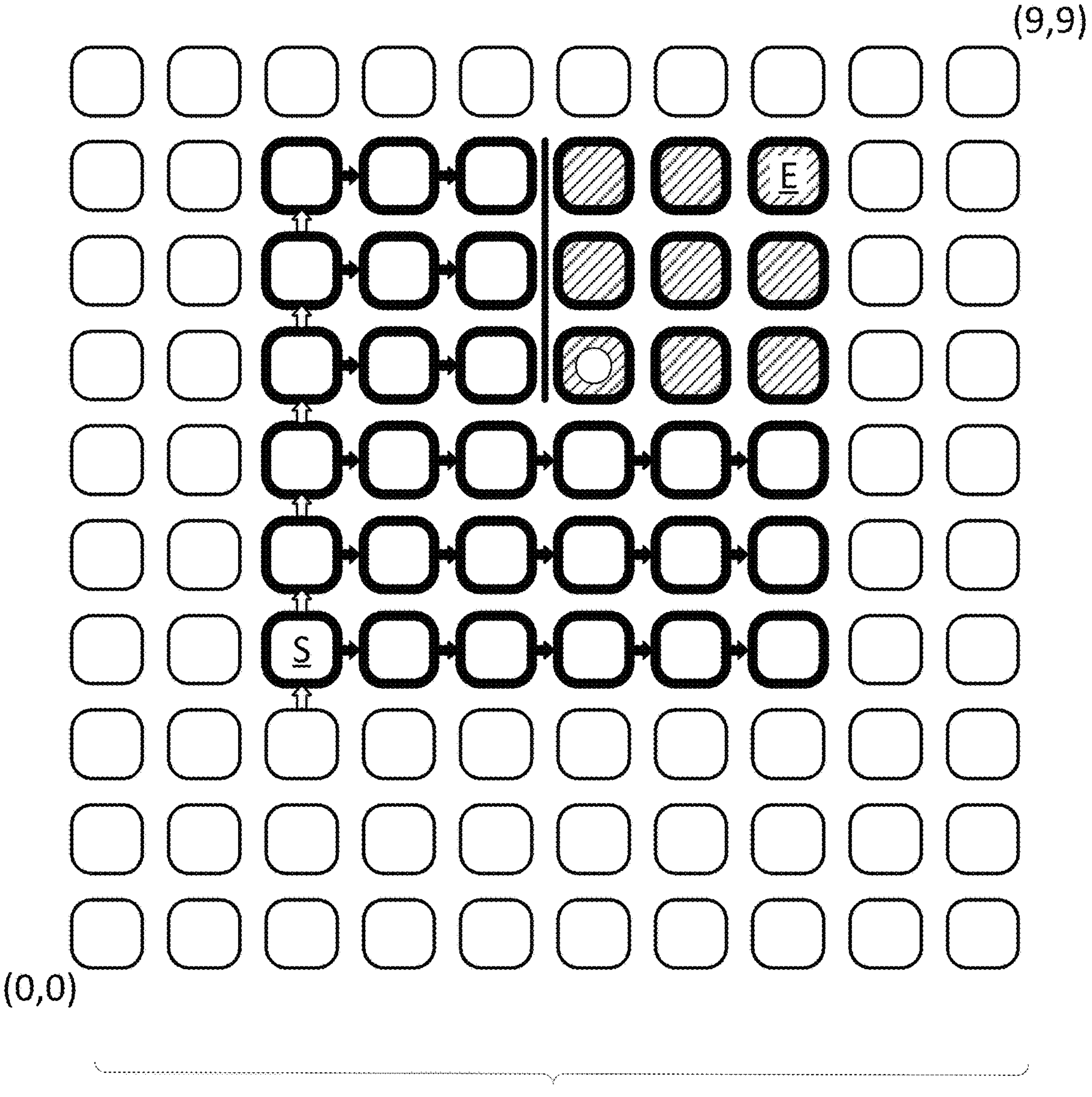
FIGS. 6, 7, and 8 show examples of addressed nodes in a network of computational nodes with quadrant exclusion and multicast message routing in accordance with specific embodiments of the inventions disclosed herein.

FIG. 6 depicts an exemplary network 600 with a quadrant-based exclusion criteria in accordance with some embodiments of the present disclosure. Network 600 includes an addressed grid beginning at start node (2,3) and ending at end node (7,8), such that the grid of addressed nodes includes 36 nodes bounded by the rectangular region defined by node (2,3), node (2,8), node (7,8), and node (7,3). Excluded nodes within the grid of addressed nodes are depicted crosshatched, with the excluded nodes including 9 nodes bounded by nodes (5,6), (5,8), (7,8), and (7,6), for a total of 27 addressed nodes and 9 excluded addressed nodes. Although the definition of the excluded rows and columns may be provided in a variety of manners, in an exemplary embodiment the exclusion criteria for the quadrant definition is based on a coordinate for one of the nodes (e.g., node (5,6) in FIG. 6, depicted with a white dot within the excluded node) and binary exclusion directions defining whether the exclusion quadrant or sub-grid extends in the positive or negative x-axis direction and positive or negative y-axis direction (e.g., positive x-axis and y-axis direction in FIG. 6). Further, in an embodiment the exclusion criteria may also include a binary enable bit to allow quadrant exclusion to be turned off without having to change other values, and an "optimize routing" bit that determines whether routing is optimized to avoid propagation of the multicast message to excluded addressed nodes where not necessary to reach other nodes. Optimizing routing reduces the usage of network bandwidth and unnecessary processing of multicast messages. An exemplary exclusion criteria for the quadrant of FIG. 6 may be as follows:

QUADRANT_EXCLUDE_COORD_X = 5

QUADRANT_EXCLUDE_COORD_Y = 6

QUADRANT_EXCLUDE_DIRECTION_X = 1

QUADRANT_EXCLUDE_DIRECTION_Y = 1

QUADRANT_EXCLUDE_ENABLE = 1

QUADRANT_EXCLUDE_OPTIMIZE_ROUTING = 1

FIG. 6 also depicts multicast message routing of the multicast message with arrows. As will be described herein, the multicast message may be received within the grid of addressed nodes from a source node adjacent to (e.g., below) the grid. The multicast message may generally be propagated along an initial propagation path vertically along a column in the positive y-direction (white arrows), and then distributed horizontally along each row in the positive x-direction (black arrows). Node barriers where propagation is stopped within the addressed grid are depicted with a solid black line. In the embodiment depicted in FIG. 6, routing is optimized to prevent unnecessary communication of multicast messages to excluded nodes and the source node is node (2,2), immediately below the start node (2,3). The multicast message propagates through column 2 to each of nodes (2,4), (2,5), (2,6), (2,7), and (2,8), and then horizontally along rows 3-8. Based on the exclusion criteria, the multicast message is not further propagated along rows 6, 7, and 8 from nodes (4,6), (4,7), and (4,8) to the excluded nodes.

Figure 7:
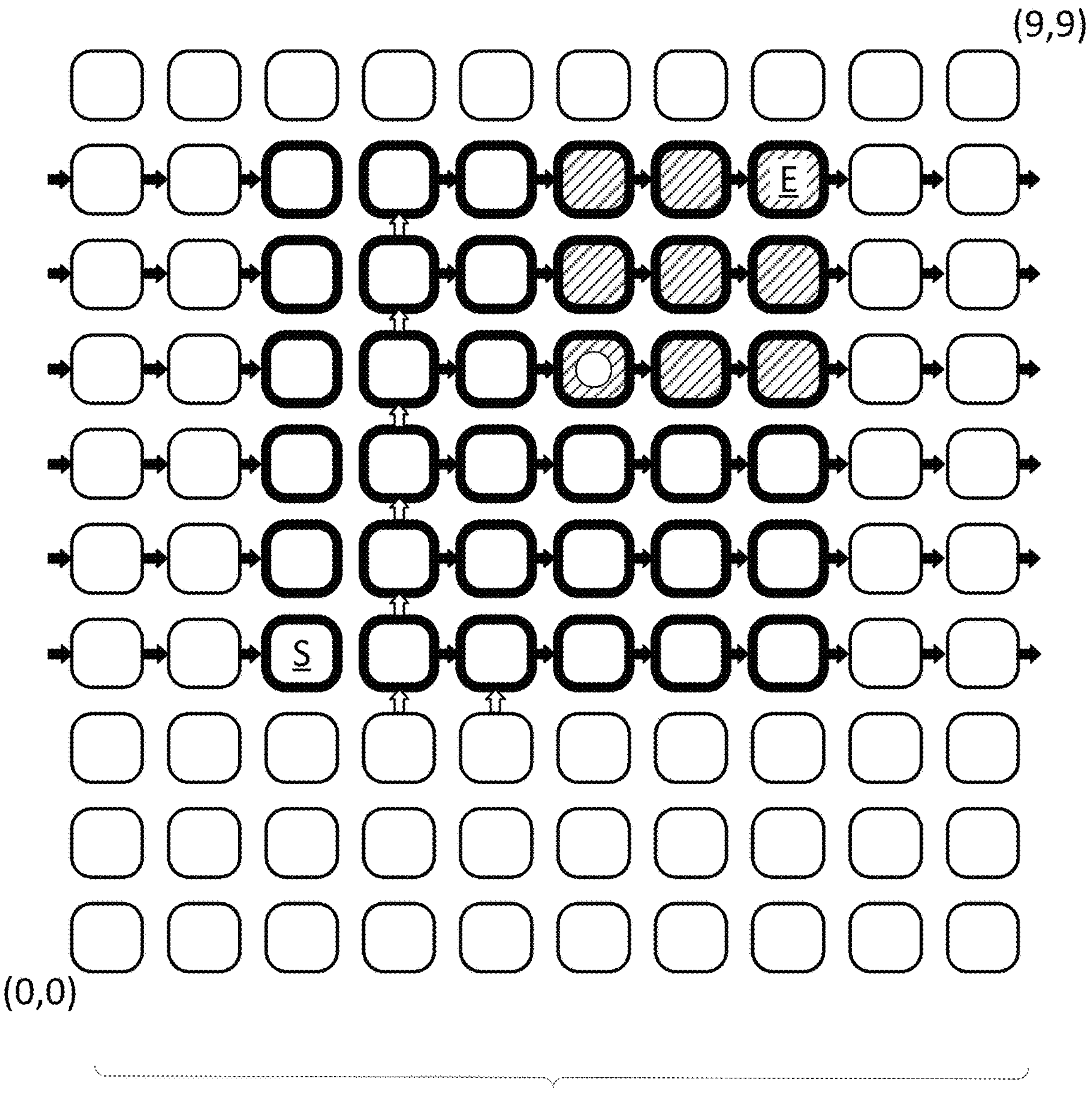
Figure 8:
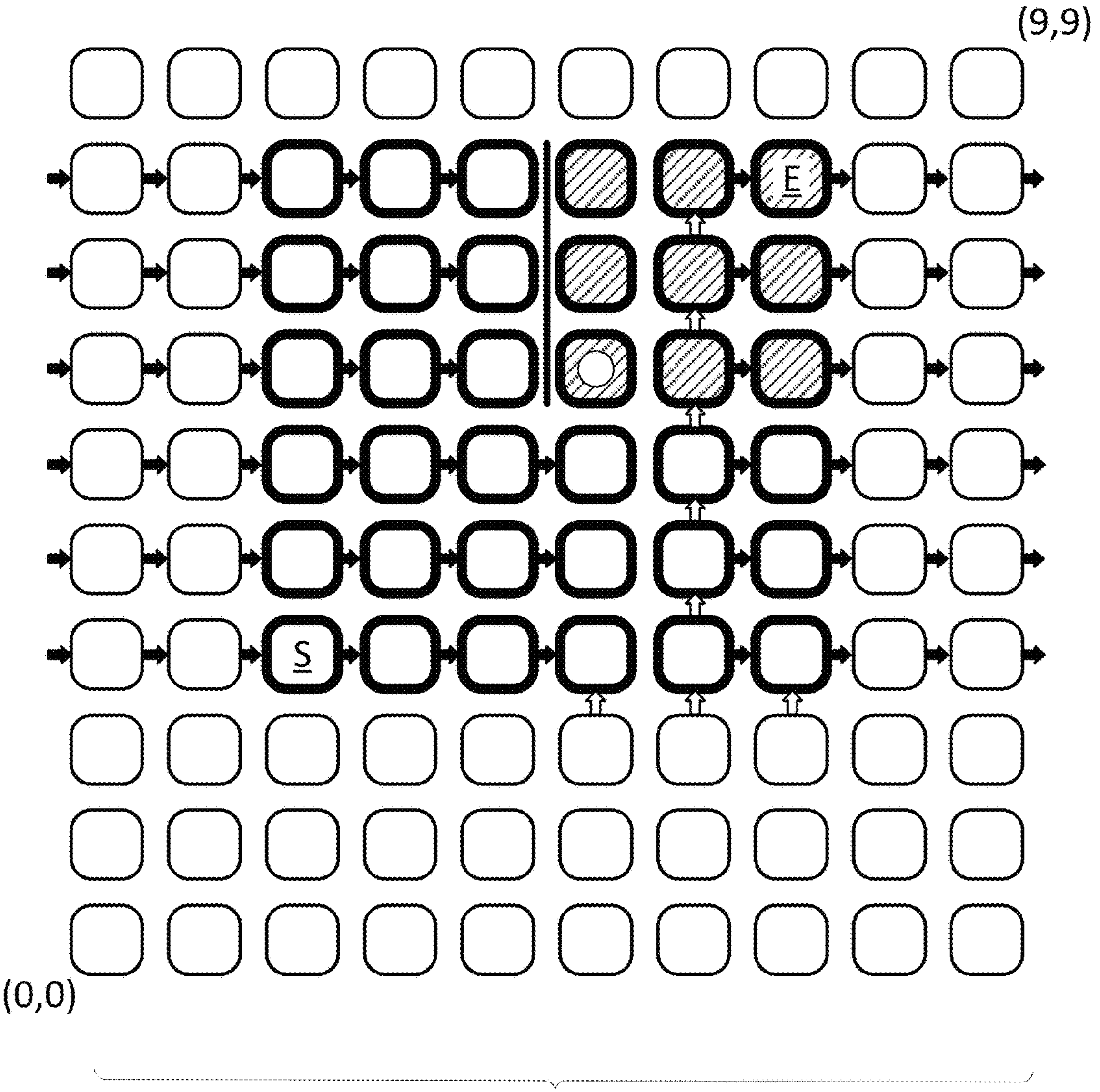

Depending on the location of the source node, routing optimization may be unavailable or may need to be modified. For example, as is depicted in FIG. 7, if the source node in network 600 is in column 3 or 4, it may be necessary to propagate the messages through the excluded nodes (e.g., without the excluded node NIUs providing the message to the respective core) to reach all of the addressed nodes (e.g., in column 2 and/or 3). As is depicted in FIG. 8, if the source node in network 600 is in column 5, 6, or 7, routing may be optimized to avoid sending multicast messages to the excluded nodes in at least column 5, and in some examples, column 6, thus reducing the overall usage of network bandwidth and processing. Exemplary logic for optimized routing in the embodiments of FIGS. 6, 7 and 8 is as follows:

(1) When in MCAST state and "turning" to bcast_direction:
curr_node_x is at bc_start_x && curr_node_y is in exclusion zone (FIG. 6)
assign next_bc_end_node=quad_excl_x−1;

(2) No routing optimization if curr_node_x>bc_start_x && curr_node_x<quad_excl_x, when in MCAST state (FIG. 7)

Figure 9:
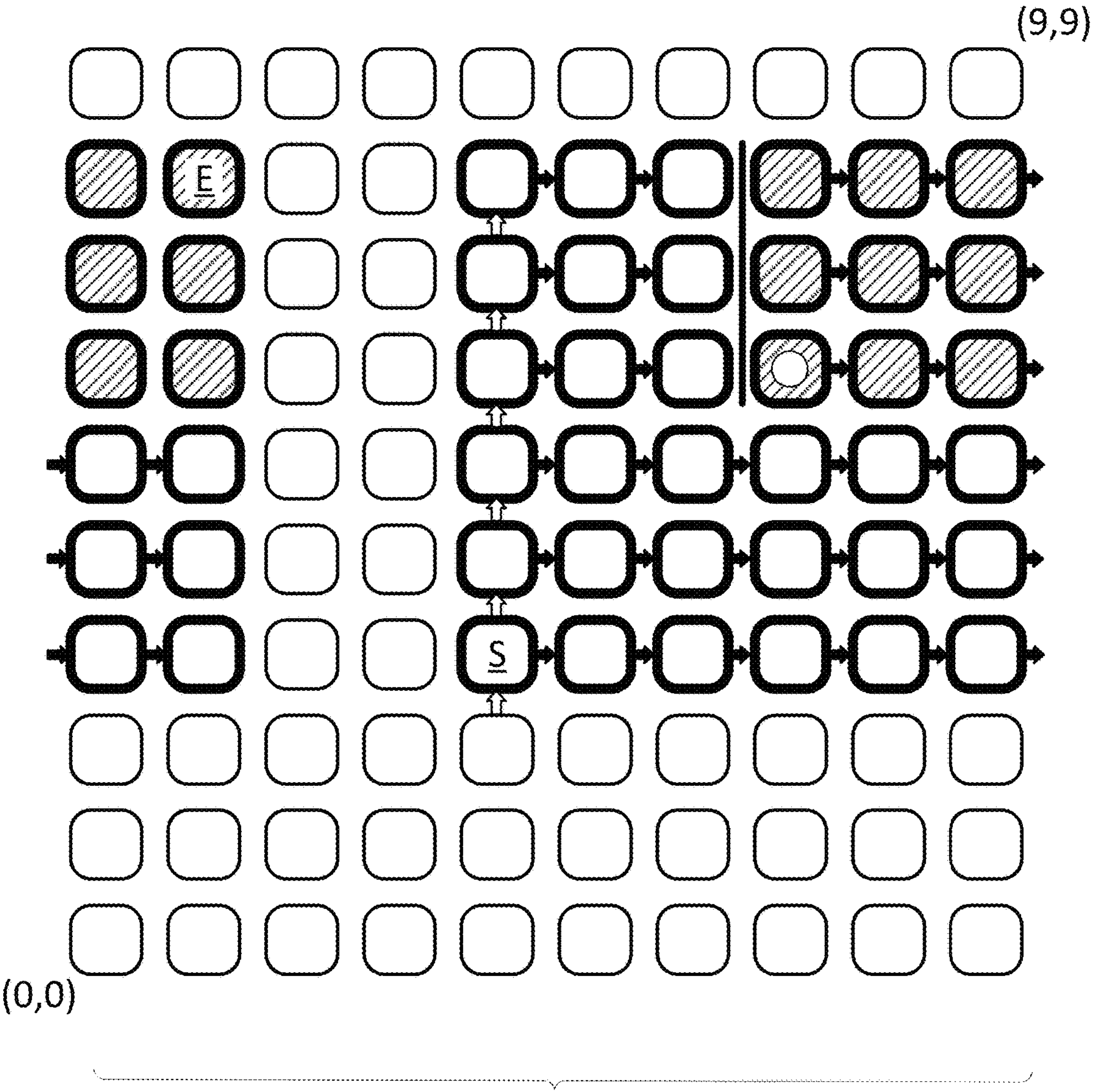
FIGS. 9, 10, and 11 show examples of addressed nodes in a network of computational nodes with quadrant exclusion and multicast message routing in accordance with specific embodiments of the inventions disclosed herein.

(3) When in MCAST state, "turning" to bcast_direction:
curr_node_x is in exclusion zone && curr_node_y is in exclusion zone (FIG. 8)
assign next_bc_end_node=quad_excl_x−1;

FIG. 9 depicts an exemplary network 900 with a quadrant-based exclusion criteria and multicast wrapping in accordance with some embodiments of the present disclosure. Network 900 includes an addressed grid beginning at start node (4,3) and ending at end node (1,8), such that the grid of addressed nodes includes 48 nodes bounded by the rectangular region defined by node (4,3), node (4,8), node (1,8), and node (1,3). Excluded nodes within the grid of addressed nodes are depicted crosshatched, with the excluded nodes including 15 nodes bounded by node (7,6), (7,8), (1,8), and (1,6), for a total of 33 addressed nodes and 15 excluded addressed nodes. Although the definition of the excluded rows and columns may be provided in a variety of manners, in an exemplary embodiment the exclusion criteria for the quadrant definition is based on a coordinate for one of the nodes (e.g., node (7,6) in FIG. 9, depicted with a white dot within the crosshatched excluded node) and binary exclusion directions defining whether the exclusion quadrant or sub-grid extends in the positive or negative x-axis direction and positive or negative y-axis direction (e.g., positive x-axis and y-axis direction in FIG. 9). An exemplary exclusion criteria for the quadrant of FIG. 9 may be as follows:

QUADRANT_EXCLUDE_COORD_X = 7

QUADRANT_EXCLUDE_COORD_Y = 6

QUADRANT_EXCLUDE_DIRECTION_X = 1

QUADRANT_EXCLUDE_DIRECTION_Y = 1

QUADRANT_EXCLUDE_ENABLE = 1

QUADRANT_EXCLUDE_OPTIMIZE_ROUTING = 1

FIG. 9 also depicts multicast message routing of the multicast message with arrows. In the embodiment depicted in FIG. 9, routing is optimized to prevent unnecessary communication of multicast messages to excluded nodes and the source node is node (4,2), immediately below the start node (4,3). The multicast message propagates through column 4 to each of nodes (4,4), (4,5), (4,6), (4,7), and (4,8), and then horizontally along rows 3-8. Based on the exclusion criteria, the multicast message is not further propagated along rows 6, 7, and 8 from nodes (6,6), (6,7), and (6,8) to the excluded nodes.

Figure 10:
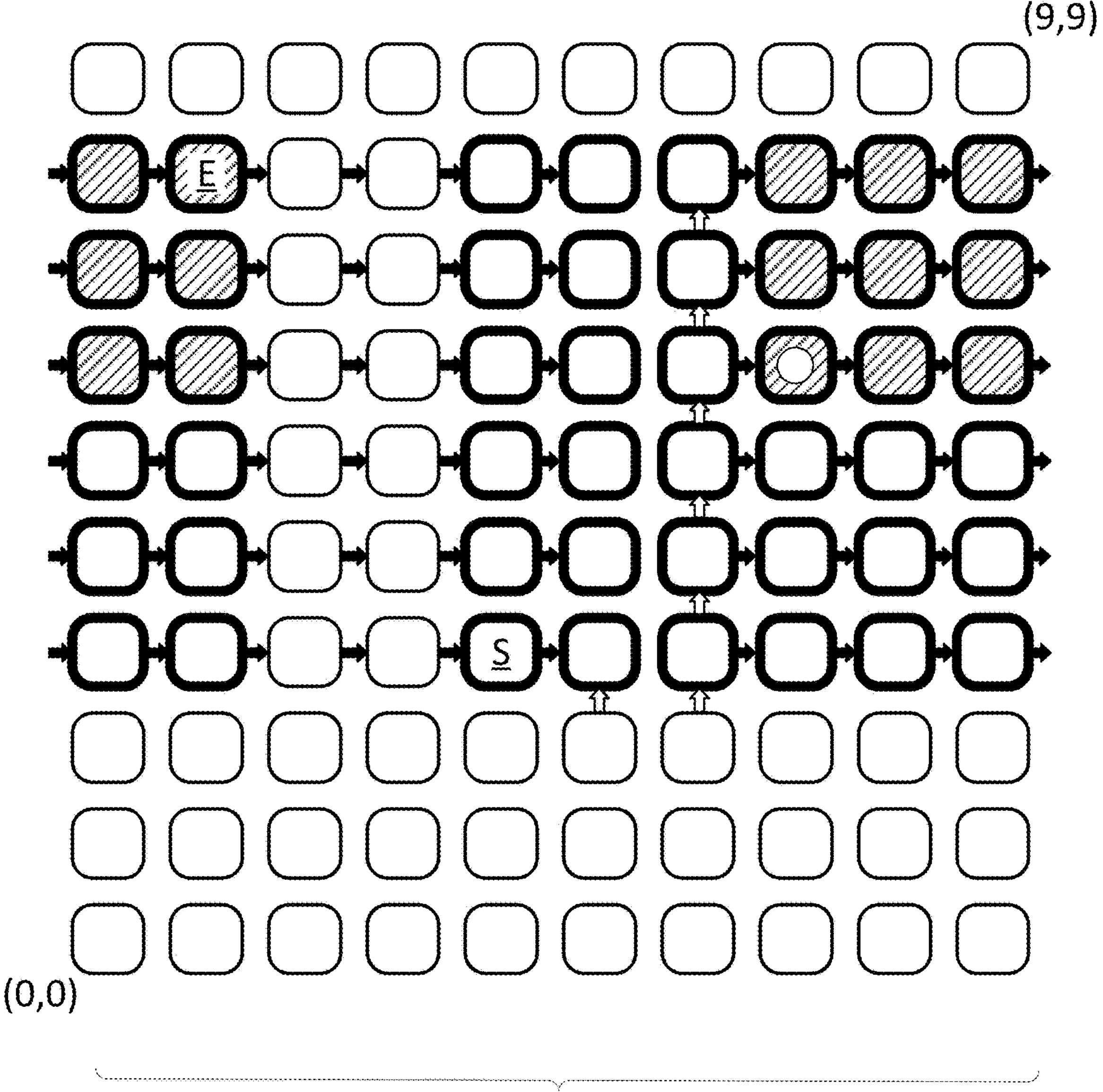
Figure 11:
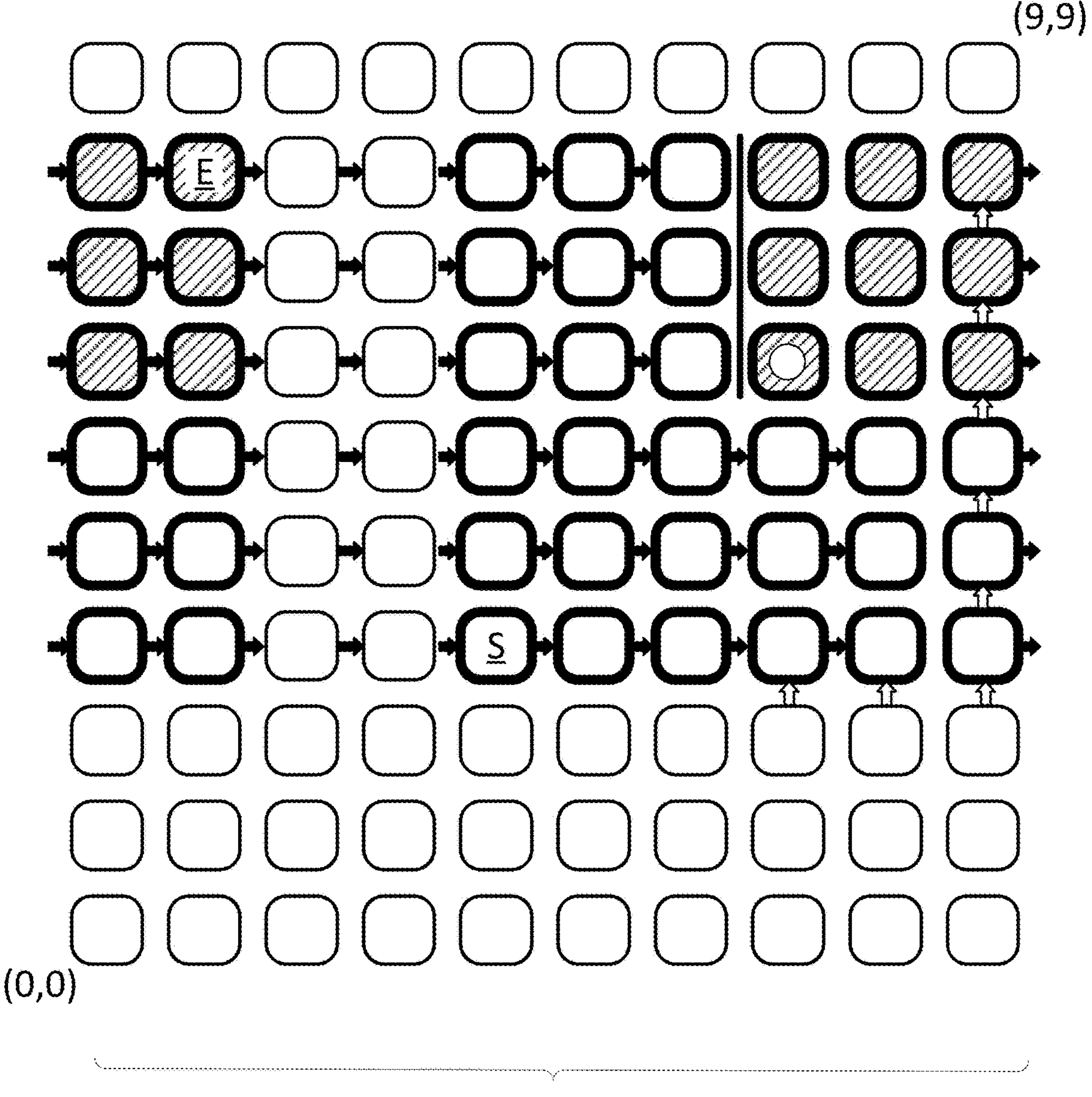
Figure 12:
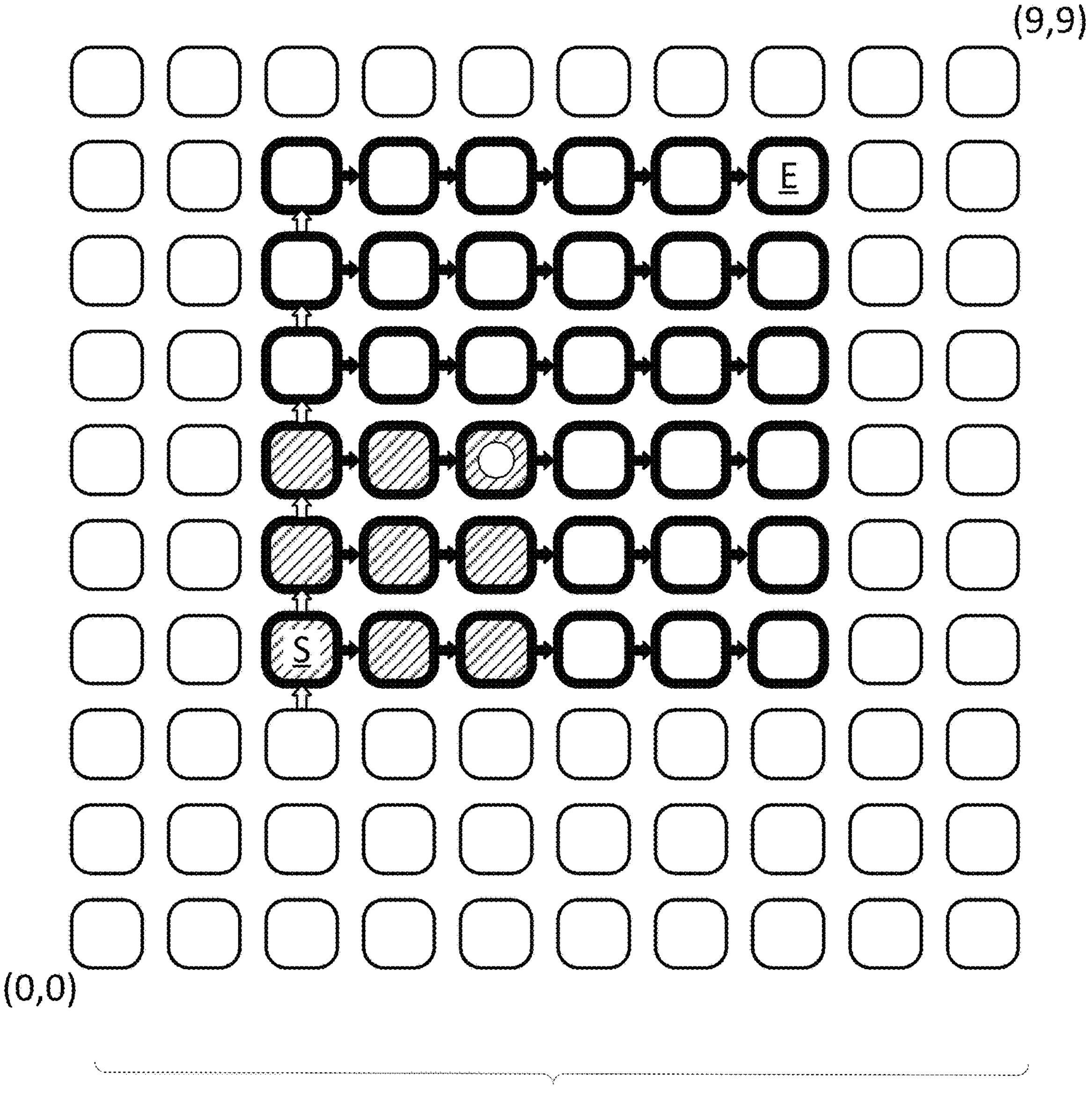
FIGS. 12, 13, and 14 show examples of addressed nodes in a network of computational nodes with quadrant exclusion and multicast message routing in accordance with specific embodiments of the inventions disclosed herein.

Depending on the location of the source node, routing optimization may be unavailable or may need to be modified. For example, as is depicted in FIG. 10, if the source node is in column 5 or 6, it may be necessary to propagate the messages through the excluded nodes (e.g., without the excluded node NIUs providing the message to the respective core) to reach all of the addressed nodes (e.g., in columns 0, 1, 4, and 5). As is depicted in FIG. 11, if the source node is in column 7, 8, or 9, routing may be optimized to avoid sending multicast messages to the excluded nodes in at least column 7 and in some examples column 8, thus reducing the overall usage of network bandwidth and processing. Exemplary logic for optimized routing in the embodiments of FIGS. 9, 10, and 11 is as follows:

(1) When in MCAST state (orange arrows) and "turning" to bcast_direction:
  curr_node_x is at bc_start_x && curr_node_y is in exclusion zone (FIG. 9)
  assign next_bc_end_node=quad_excl_x−1;
(2) No routing optimization if curr_node_x>bc_start_x && curr_node_x<quad_excl_x, when in MCAST state (FIG. 10).
(3) When in MCAST state, "turning" to bcast_direction:
  curr_node_x is in exclusion zone && curr_node_y is in exclusion zone (FIG. 11)
  assign next_bc_end_node=quad_excl_x−1;

FIG. 12 depicts an exemplary network 1200 with a quadrant-based exclusion criteria and negative exclude directions in accordance with some embodiments of the present disclosure. Network 1200 includes an addressed grid beginning at start node (2,3) and ending at end node (7,8), such that the grid of addressed nodes includes 36 nodes bounded by the rectangular region defined by node (2,3), node (2,8), node (7,8), and node (7,3). Excluded nodes within the grid of addressed nodes are depicted in crosshatched, with the excluded nodes including 9 nodes bounded by node (2,3), (2,5), (4,5), and (4,3), for a total of 27 addressed nodes and 9 excluded addressed nodes. Although the definition of the excluded rows and columns may be provided in a variety of manners, in an exemplary embodiment the exclusion criteria for the quadrant definition is based on a coordinate for one of the nodes (e.g., node (4,5) in FIG. 12, depicted with a white dot within the crosshatched excluded node) and binary exclusion directions defining that the exclusion quadrant or sub-grid extends in the negative x-axis direction and negative y-axis direction. An exemplary exclusion criteria for the quadrant of FIG. 12 may be as follows:

QUADRANT_EXCLUDE_COORD_X = 4

QUADRANT_EXCLUDE_COORD_Y = 5

QUADRANT_EXCLUDE_DIRECTION_X = 0

QUADRANT_EXCLUDE_DIRECTION_Y = 0

QUADRANT_EXCLUDE_ENABLE = 1

QUADRANT_EXCLUDE_OPTIMIZE_ROUTING = 1

Figure 13:
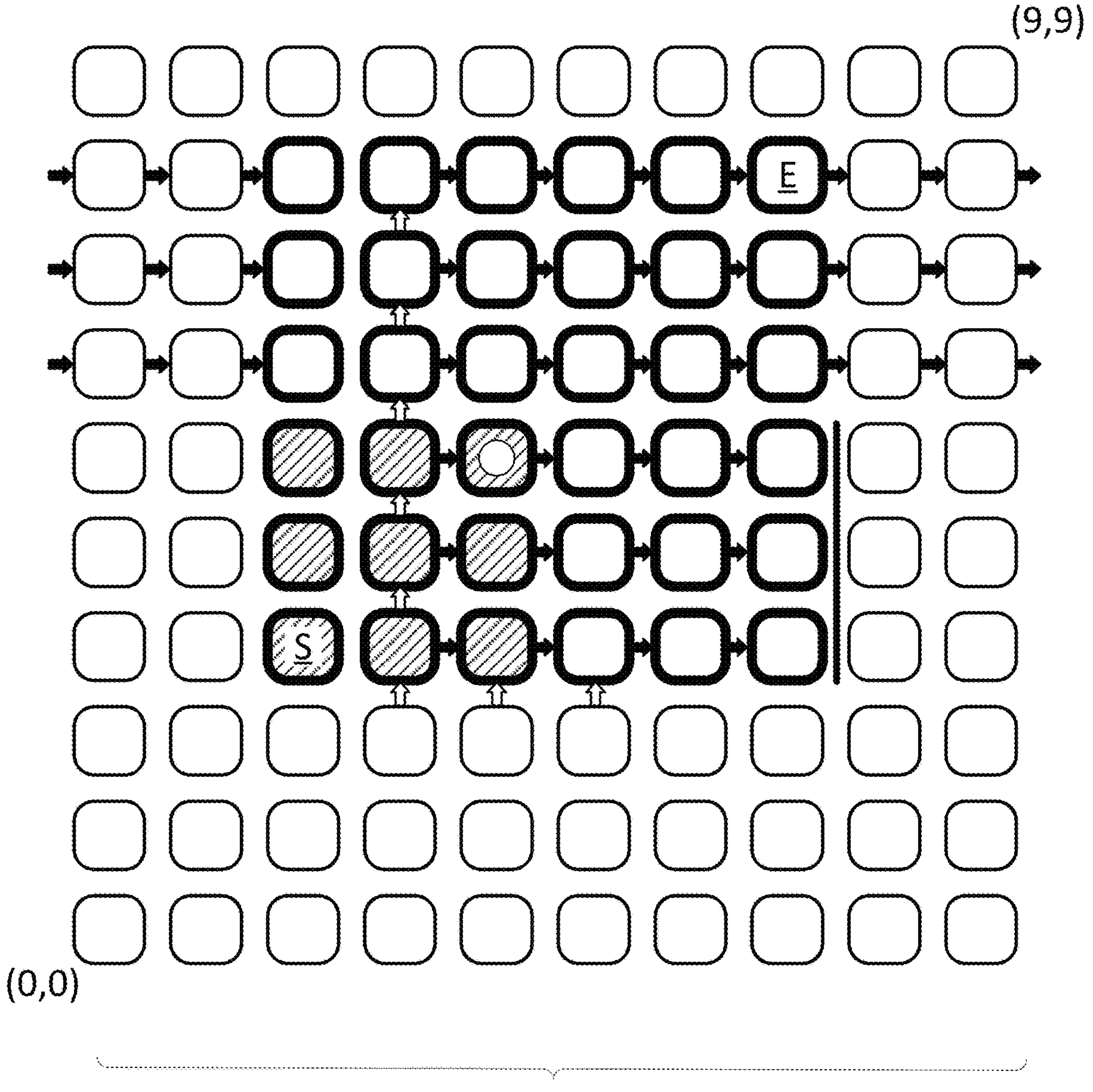
Figure 14:
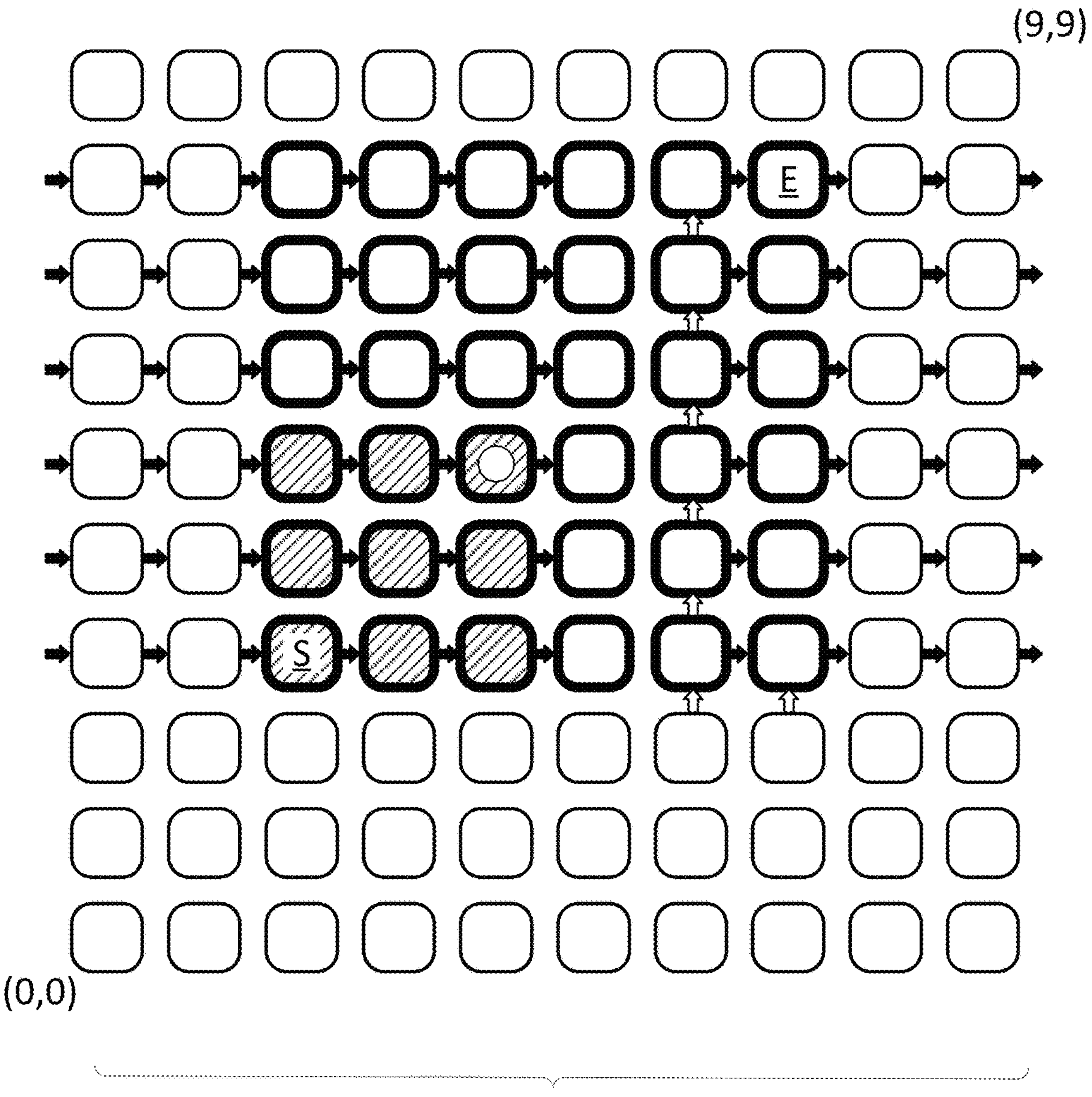

FIG. 12 also depicts multicast message routing of the multicast message with arrows. In the embodiment depicted in FIG. 12, it is not possible to optimize routing when the source node (2,2) is immediately below the start node (2,3), since the most efficient path to propagate the multicast message is through the excluded nodes. Where the source node is at other locations, routing optimization may be available and/or modified. For example, as is depicted in FIG. 13, if the source node in network 1200 is in column 3, 4, or 5, it is possible to propagate the messages to all non-excluded addressed nodes while not forwarding the message through at least some of the excluded addressed nodes, for example, in column 2, 3, and/or 4. Multicast message propagation within rows 3, 4, and 5 stops before the nodes of column 8. As is depicted in FIG. 14, if the source node in network 1200 is in column 6 or 7, the optimized propagation path includes the excluded nodes in order to provide the multicast message to nodes (5,5), (5,4), and (5,3). Exemplary logic for optimized routing in the embodiments of FIGS. 12, 13, and 14 is as follows:

(1) No routing optimization if curr_node_x==bc_start_x, when in MCAST state (FIG. 12). But to simplify logic, group this as optimization candidate, since end_node is going to be bc_end_x anyway.
(2) When in MCAST state, "turning" to bcast_direction:
  curr_node_x is in exclusion zone && curr_node_y is in exclusion zone &&
  curr_node_x is not bc_start_x||curr_node_x is quad_excl_x+1 &&
  curr_node_y is in exclusion zone (FIG. 13)
  assign next_bc_end_node=bc_end_x;
(2) No routing optimization if curr_node_x>quad_excl_x+1 && curr_node_x<=bc_end_x, when in MCAST state (FIG. 14).

Figure 15:
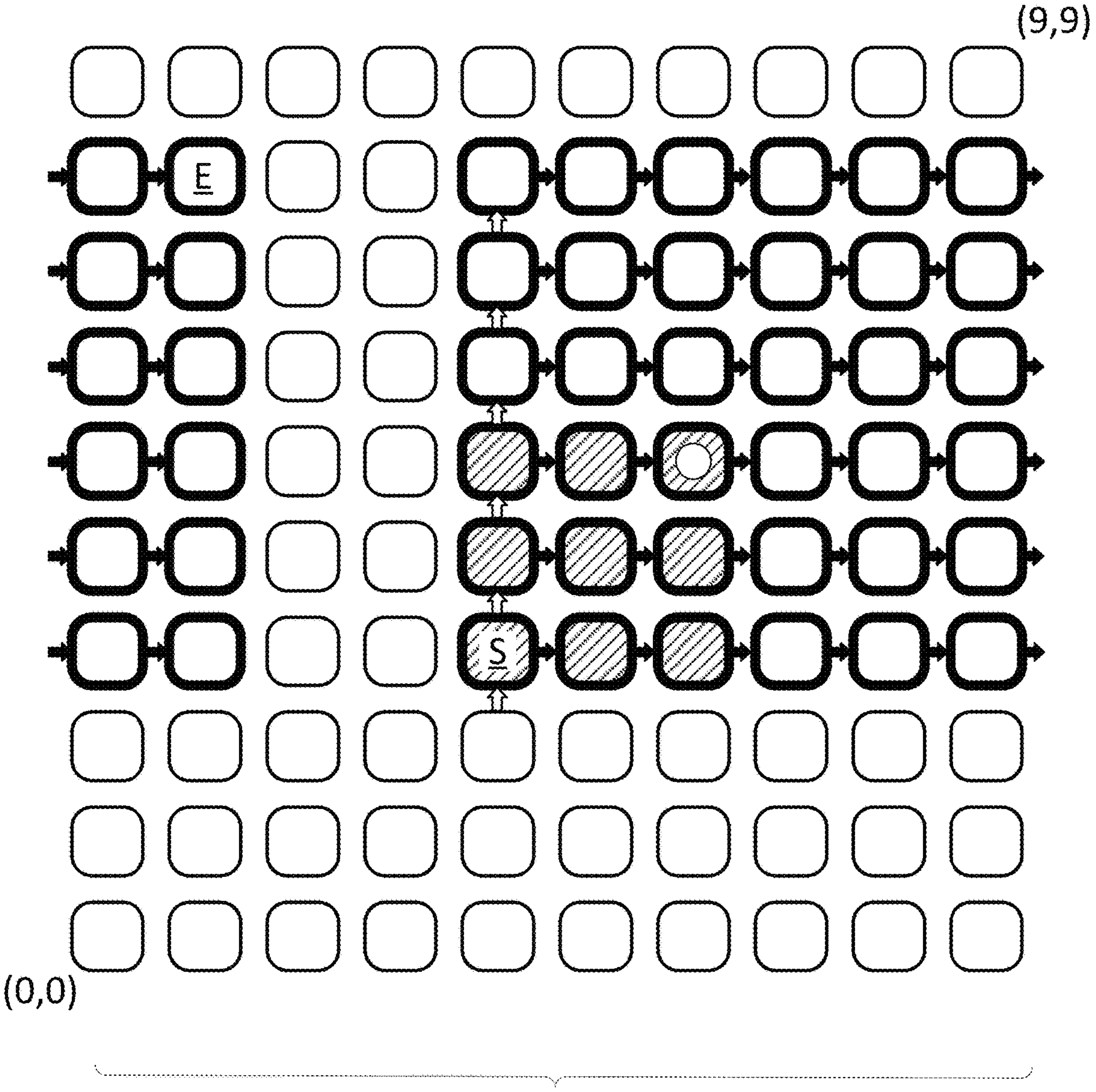
FIGS. 15, 16, and 17 show examples of addressed nodes in a network of computational nodes with quadrant exclusion and multicast message routing in accordance with specific embodiments of the inventions disclosed herein.

FIG. 15 depicts an exemplary network 1500 with a quadrant-based exclusion criteria and negative exclude directions wrapping through the network 1500 in accordance with some embodiments of the present disclosure. Network 1500 includes an addressed grid beginning at start node (4,3) and ending at end node (1,8), such that the grid of addressed nodes includes 48 nodes bounded by the rectangular region defined by node (4,3), node (4,8), node (1,8), and node (1,3). Excluded nodes within the grid of addressed nodes are depicted crosshatched, with the excluded nodes including 9 nodes bounded by node (6,5), (6,3), (4,3), and (4,5), for a total of 39 addressed nodes and 9 excluded addressed nodes. Although the definition of the excluded rows and columns may be provided in a variety of manners, in an exemplary embodiment the exclusion criteria for the quadrant definition is based on a coordinate for one of the nodes (e.g., node (6,5) in FIG. 15, depicted with a white dot within the crosshatched excluded node) and binary exclusion directions defining that the exclusion quadrant or sub-grid extends in the negative x-axis direction and negative y-axis direction. An exemplary exclusion criteria for the quadrant of FIG. 15 may be a follows:

QUADRANT_EXCLUDE_COORD_X = 6

QUADRANT_EXCLUDE_COORD_Y = 5

QUADRANT_EXCLUDE_DIRECTION_X = 0

QUADRANT_EXCLUDE_DIRECTION_Y = 0

QUADRANT_EXCLUDE_ENABLE = 1

QUADRANT_EXCLUDE_OPTIMIZE_ROUTING = 1

Figure 16:
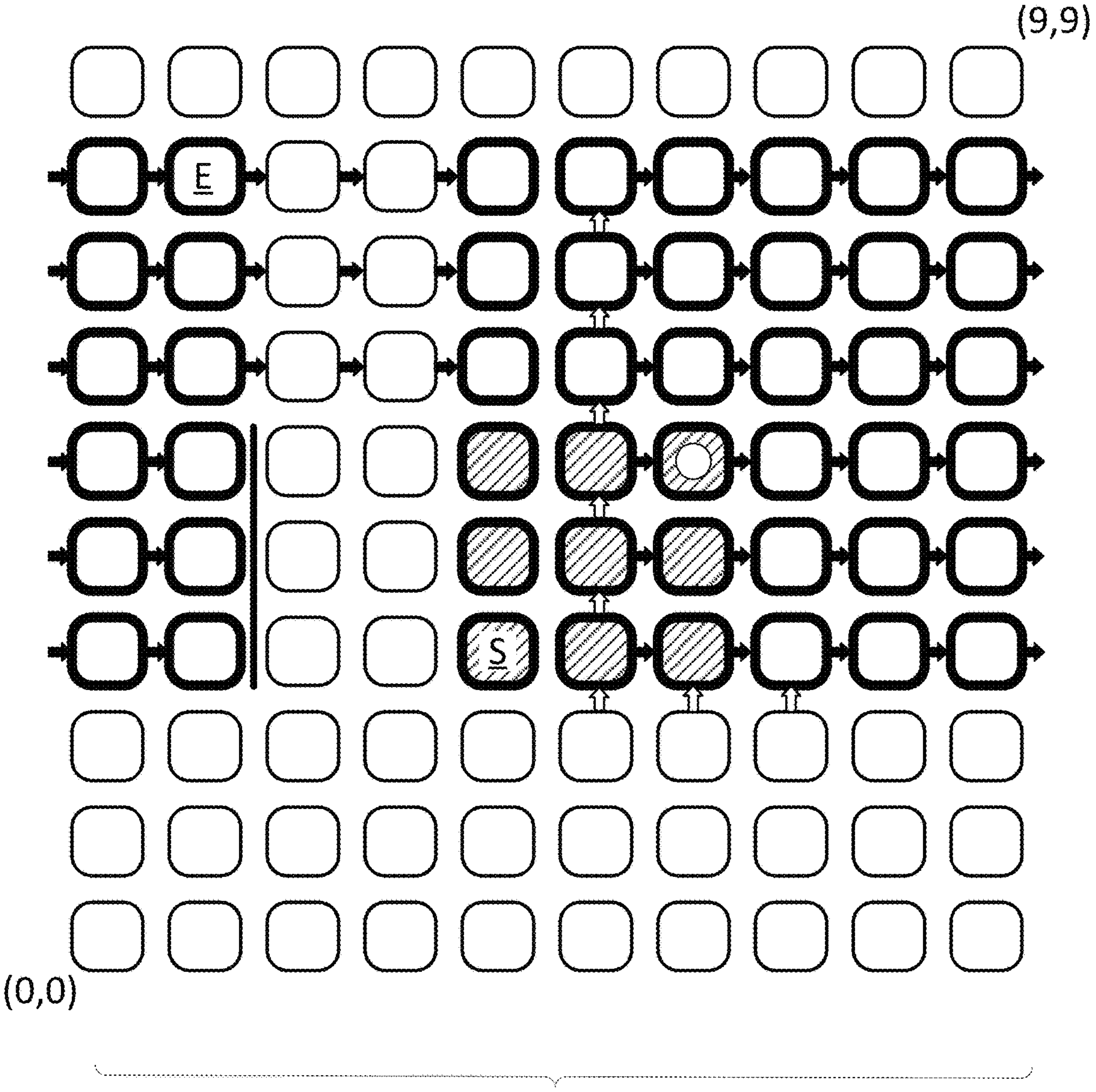
Figure 17:
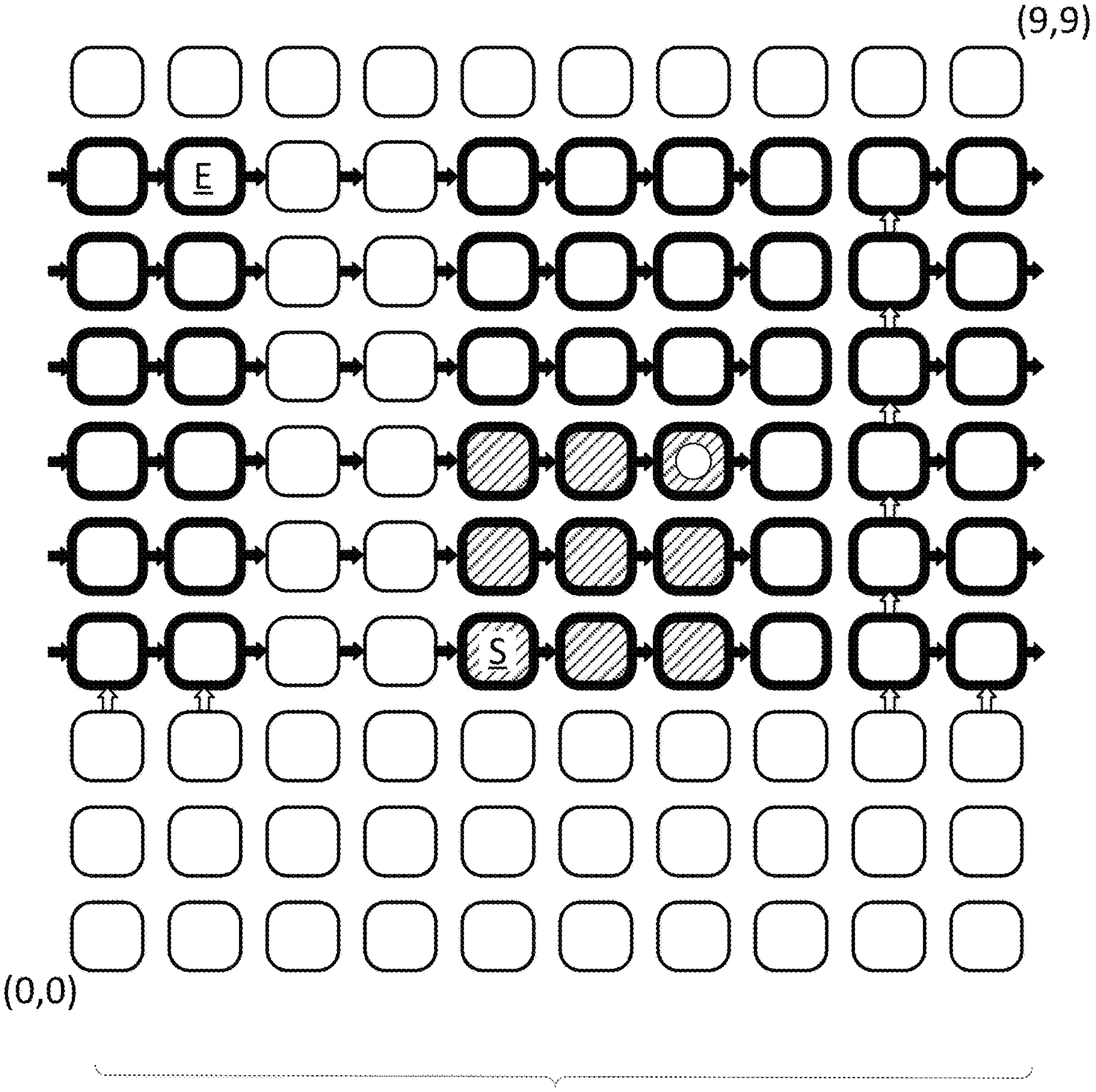

FIG. 15 also depicts multicast message routing of the multicast message with arrows. In the embodiment depicted in FIG. 15, it is not possible to optimize routing when the source node (4,2) is immediately below the start node (4,3), since the most efficient path to propagate the multicast message is through the excluded nodes. Where the source node is at other locations, routing optimization may be available and/or modified. For example, as is depicted in FIG. 16, if the source node in network 1500 is in column 5, 6, or 7, it is possible to propagate the messages to all non-excluded addressed nodes while not forwarding the message through at least some of the excluded addressed nodes, for example, in column 4, 5, and/or 6. Multicast message propagation within rows 3, 4, and 5 stops before the nodes of column 2. As is depicted in FIG. 17, if the source node is in column 8, 9, 0, or 1, the optimized propagation path includes the excluded nodes in order to provide the multicast message to nodes (7,5), (7,4), and (7,3). Exemplary logic for optimized routing in the embodiments of FIGS. 15, 16, and 17 is as follows:

(1) No routing optimization if curr_node_x==bc_start_x, when in MCAST state (FIG. 15). But to simplify logic, group this as optimization candidate, since end_node is going to be bc_end_x anyway.

(2) When in MCAST state, "turning" to bcast_direction: curr_node_x is in exclusion zone && curr_node_y is in exclusion zone && curr_node_x is not bc_start_x-||curr_node_x is quad_excl_x+1 && curr_node_y is in exclusion zone (FIG. 16)
assign next_bc_end_node=bc_end_x;

(3) No routing optimization if curr_node_x>quad_excl_x+1 && curr_node_x<=bc_end_x, when in MCAST state (FIG. 17).

Figure 18:
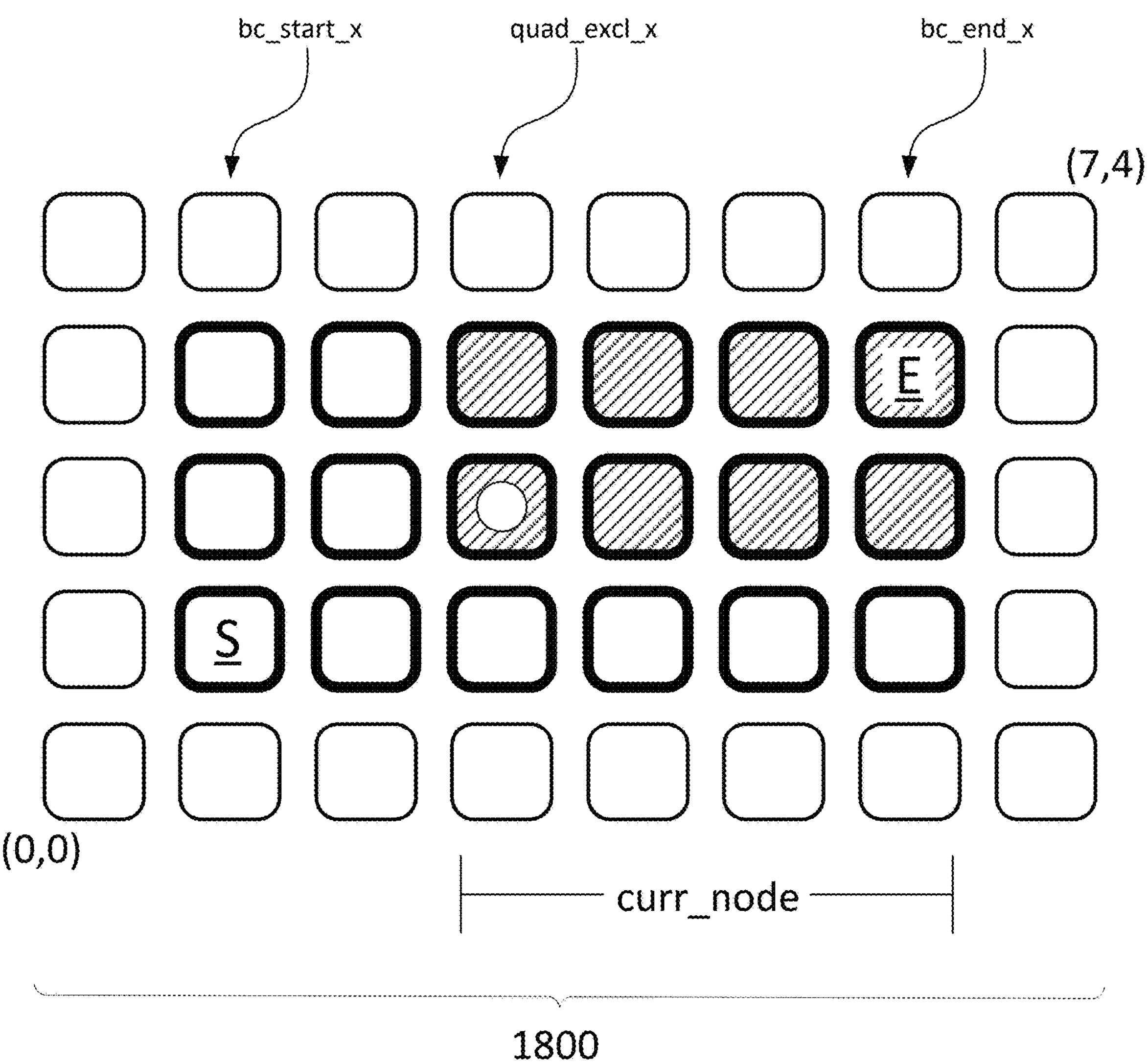
FIGS. 18, 19, and 20 show examples of addressed nodes in a network of computational nodes with an excluded subgrid in accordance with specific embodiments of the inventions disclosed herein.
Figure 19:
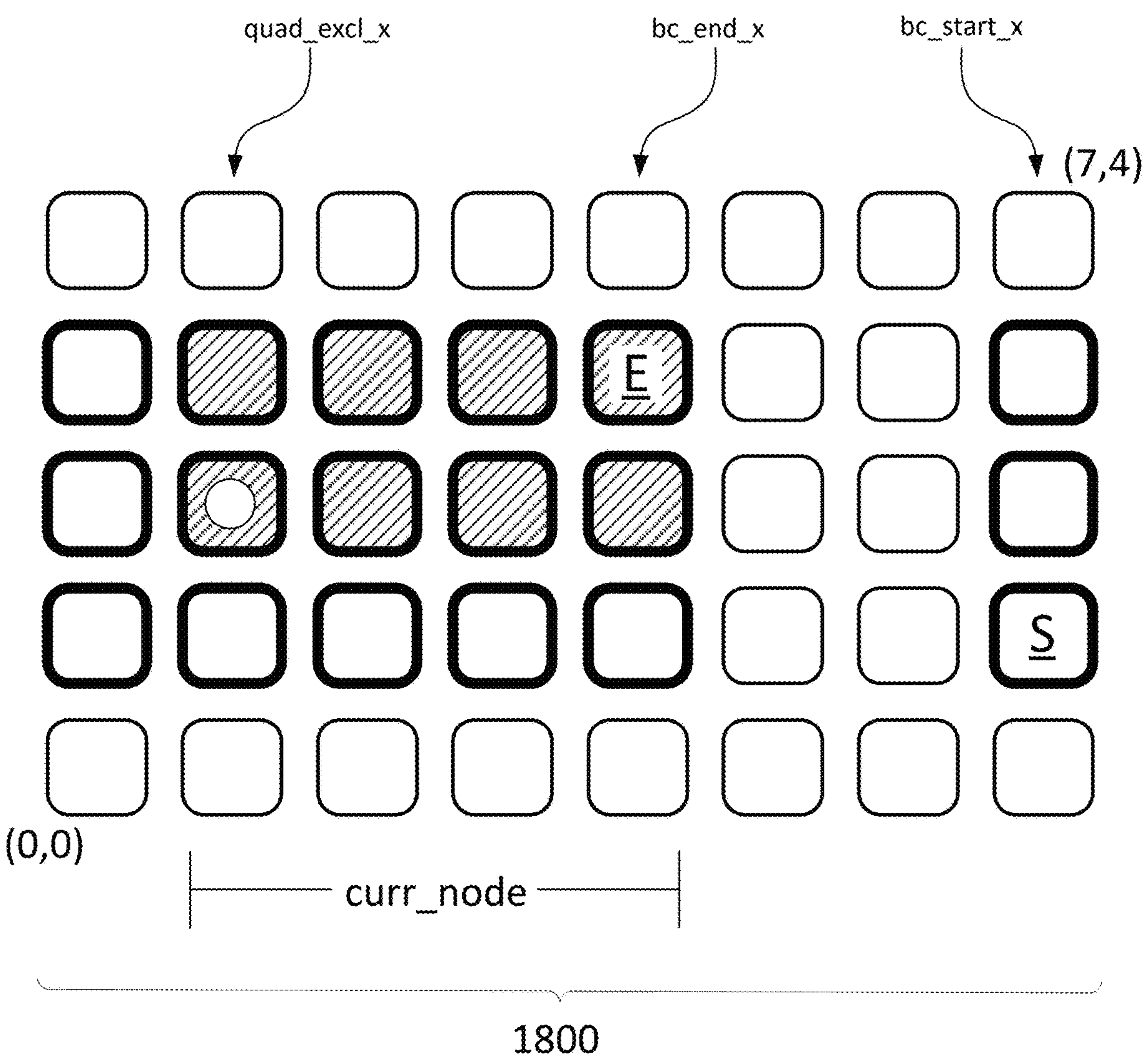
Figure 20:
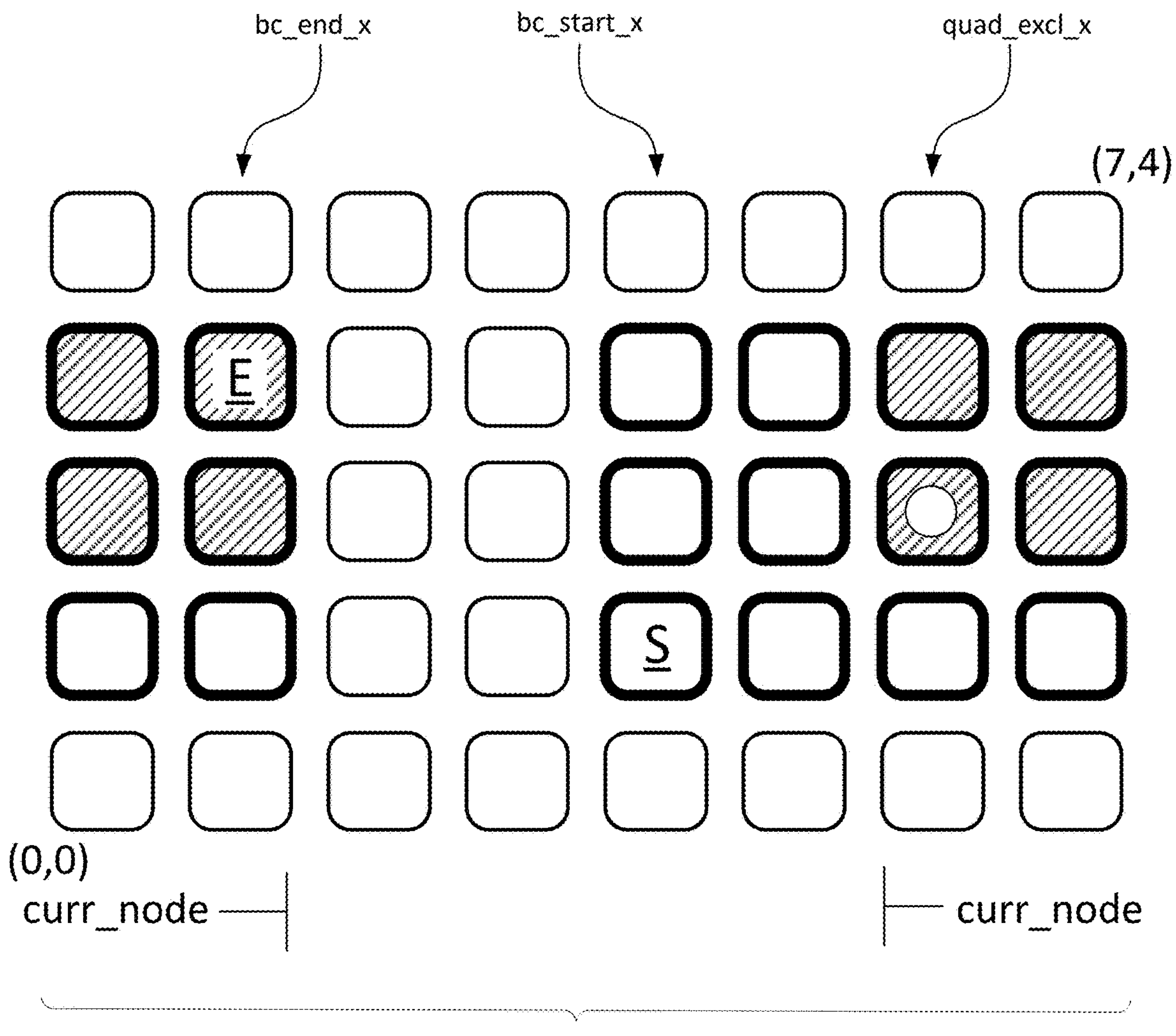
Figure 21:
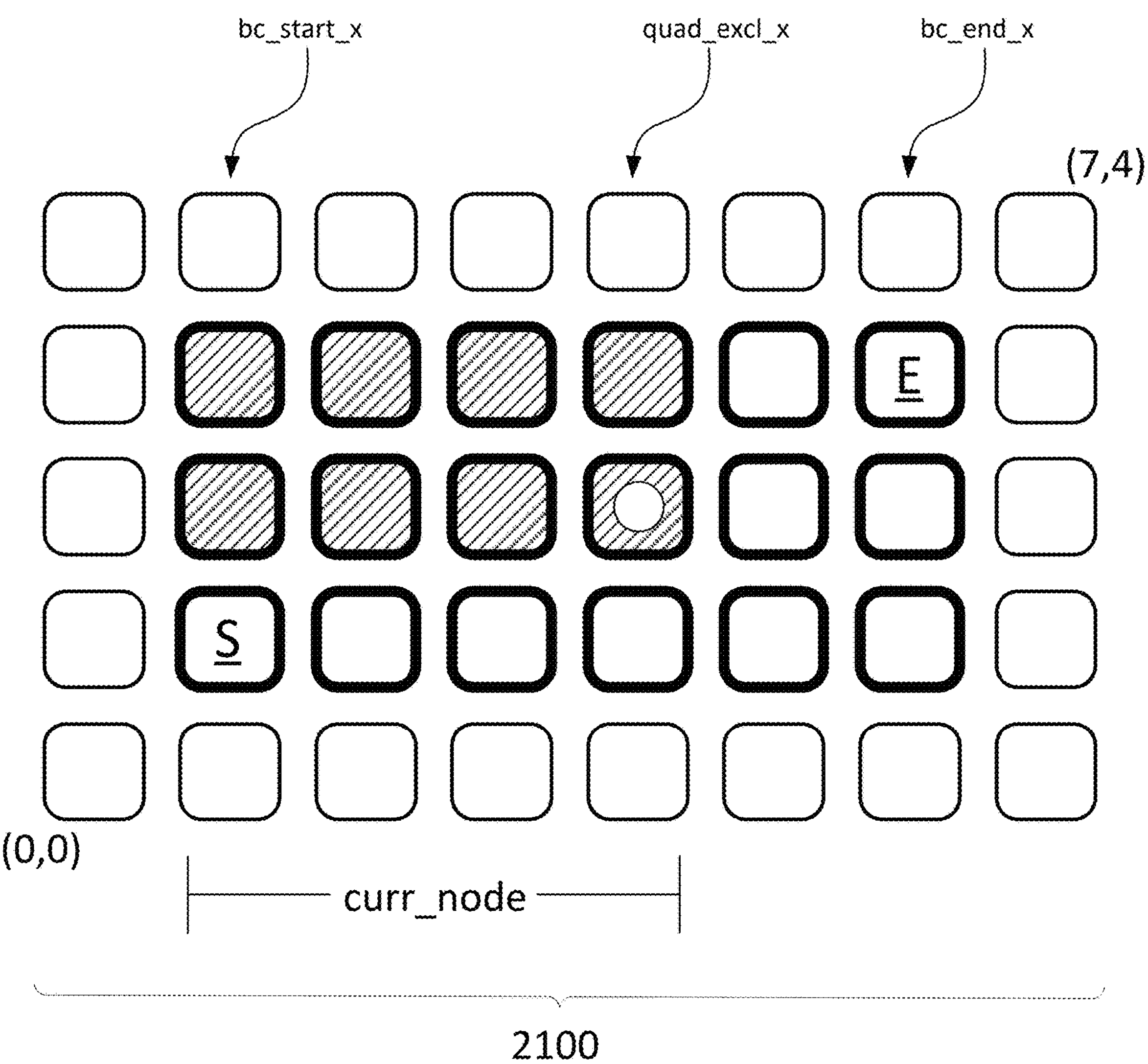
FIGS. 21, 22, and 23 show examples of addressed nodes in a network of computational nodes with an excluded subgrid in accordance with specific embodiments of the inventions disclosed herein.
Figure 22:
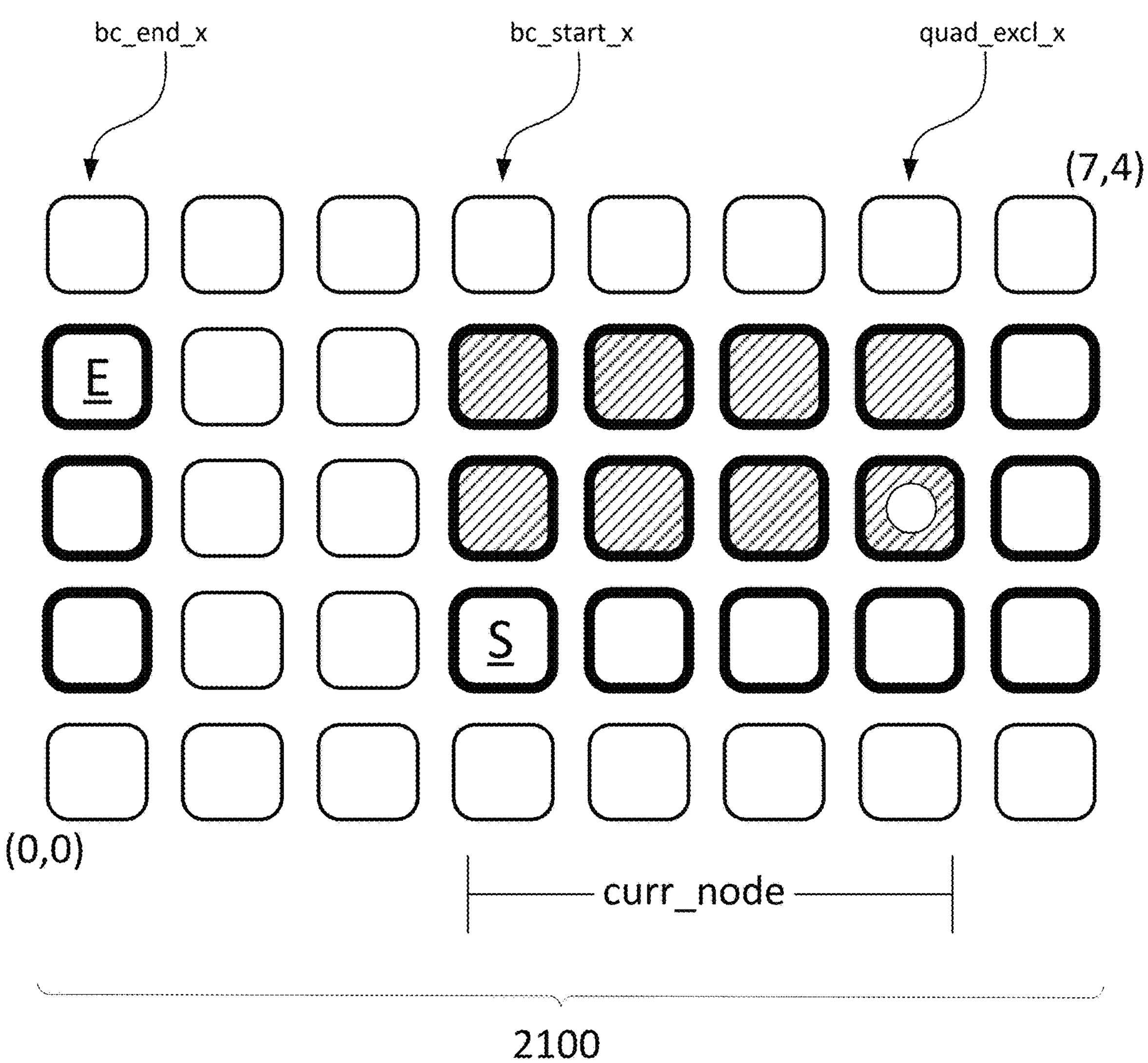
Figure 23:
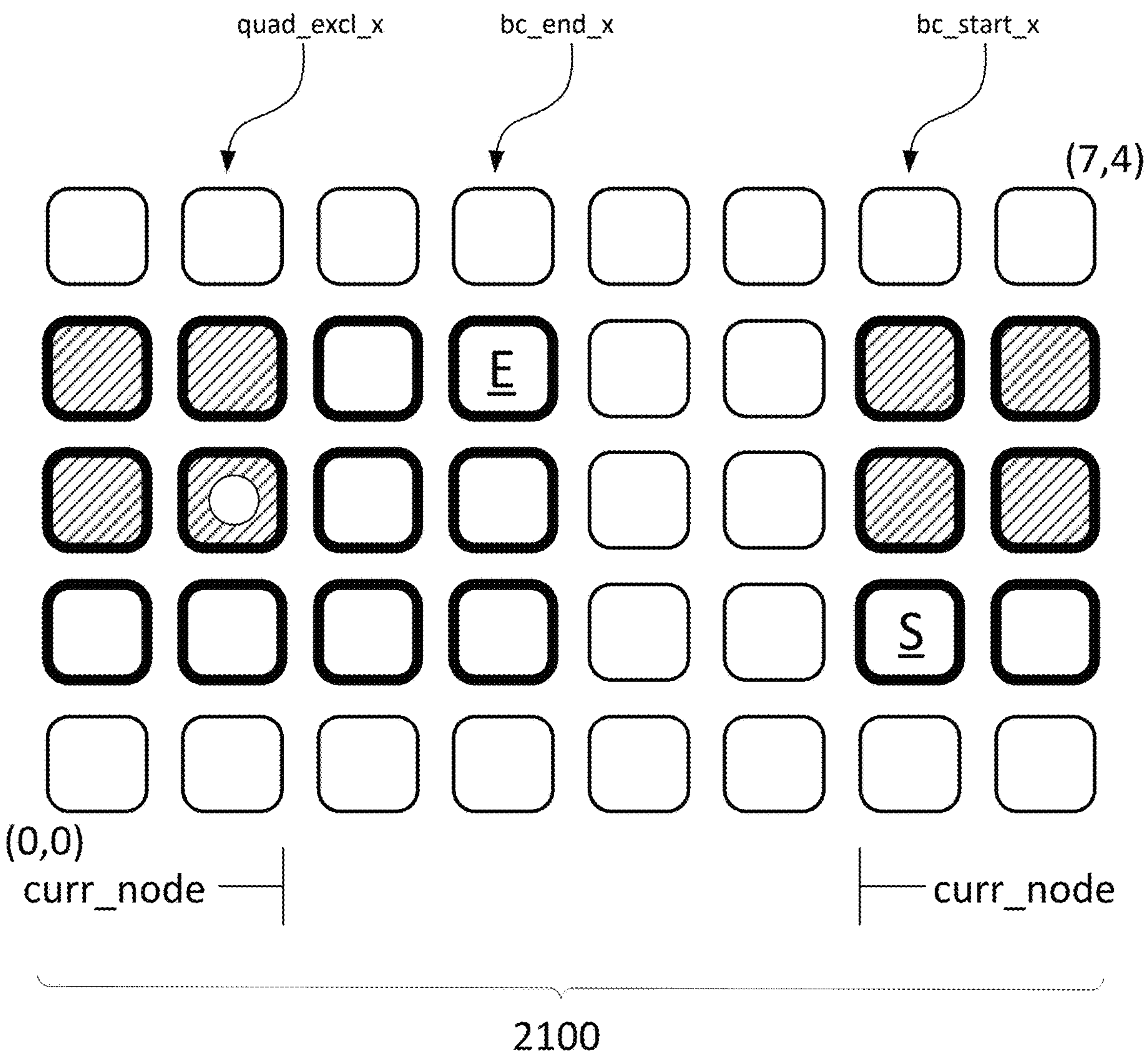

FIGS. 18-20 depict an exemplary 8×5 network 1800 with a 6×3 addressed grid and a 4×2 excluded sub-grid, resulting in an "L" configuration of addressed and excluded nodes. In FIG. 18, the start coordinate is (1,1), the end coordinate is (6,3), the exclusion node is (3,2), and the x and y exclusion directions are both positive (e.g., a direction value of "1"). Based on this addressing of addressed nodes and excluded nodes for a multicast message, there is no wrapping within the addressed nodes. The start column (labeled as bc_start_x) is column 1, the end column (labeled as bc_end_x) is column 6, and the column of the exclusion node (labeled as quad_excl_x) is column 3. A logic and vector notation for forwarding to or between the exclusion nodes (labeled as curr_node) where there is no wrapping and the x and y exclusion directions are positive (e.g., when bc_start_x<quad_excl_x<=bc_end_x) is as follows:

Do not forward to NIU if:
curr_node>=quad_excl_x && curr_node<=bc_end_x
Vector notation:
[bc_end_x:quad_excl_x]=disable forward to NIU In FIG. 19, the start coordinate is (7,1), the end coordinate is (4,3), the exclusion node is (1,2), and the x and y exclusion directions are both positive (e.g., a direction value of "1"). Based on this addressing of addressed nodes and excluded nodes for a multicast message, there is wrapping within the addressed nodes but not the excluded nodes. The start column (labeled as bc_start_x) is column 7, the end column (labeled as bc_end_x) is column 4, and the column of the exclusion node (labeled as quad_excl_x) is column 1. A logic and vector notation for forwarding to or between one of the exclusion nodes (labeled as curr_node) where there is wrapping of addressed nodes but not excluded nodes and the x and y exclusion directions are positive (e.g., when quad_excl_x<=bc_end_x<bc_start_x is as follows:

Do not forward to NIU if:
curr_node>=quad_excl_x && curr_node<=bc_end_x
Vector notation:
[bc_end_x:quad_excl_x]=disable forward to NIU In FIG. 20, the start coordinate is (4,1), the end coordinate is (1,3), the exclusion node is (6,2), and the x and y exclusion directions are both positive (e.g., a direction value of "1"). Based on this addressing of addressed nodes and excluded nodes for a multicast message, there is wrapping within the addressed nodes including the excluded nodes. The start column (labeled as bc_start_x) is column 4, the end column (labeled as bc_end_x) is column 1, and the column of the exclusion node (labeled as quad_excl_x) is column 6. A logic and vector notation for forwarding to or between one of the exclusion nodes (labeled as curr_node) where there is wrapping of addressed nodes including excluded nodes and the x and y exclusion directions are positive (e.g., when bc_end_x<bc_start_x<quad_excl_x) is as follows:

Do not forward to NIU if:
curr_node>=quad_excl_x||curr_node<=bc_end_x
Vector notation:
[bc_end_x:0]=disable forward to NIU
[noc_last_x: quad_excl_x]=disable forward to NIU FIGS. 21-23 depict an exemplary 8×5 network 2100 with a 6×3 addressed grid and a 4×2 excluded sub-grid, resulting in a backwards "L" configuration of addressed and excluded nodes. In FIG. 21, the start coordinate is (1,1), the end coordinate is (6,3), the exclusion node is (4,2), the x exclusion direction is negative (e.g., a direction value of "0"), and the y exclusion direction is positive (e.g., a direction value of "1"). Based on this addressing of addressed nodes and excluded nodes for a multicast message, there is no wrapping within the addressed nodes. The start column (labeled as bc_start_x) is column 1, the end column (labeled as bc_end_x) is column 6, and the column of the exclusion node (labeled as quad_excl_x) is column 4. A logic and vector notation for forwarding to or between the exclusion nodes (labeled as curr_node) where there is no wrapping, the x exclusion direction is negative, and the y exclusion direction is positive (e.g., when bc_start_x<quad_excl_x<=bc_end_x) is as follows:

Do not forward to NIU if:
curr_node>=bc_start_x && curr_node<=quad_excl_x
Vector notation:
[quad_excl_x:bc_start_x]=disable forward to NIU In FIG. 22, the start coordinate is (3,1), the end coordinate is (0,3), the exclusion node is (6,2), the x exclusion direction is negative (e.g., a direction value of "0"), and the y exclusion direction is positive (e.g., a direction value of "1"). Based on this addressing of addressed nodes and excluded nodes for a multicast message, there is wrapping within the addressed nodes but not the excluded nodes of the addressed nodes. The start column (labeled as bc_start_x) is column 3, the end column (labeled as bc_end_x) is column 0, and the column of the exclusion node (labeled as quad_excl_x) is column 6. A logic and vector notation for forwarding to or between the exclusion nodes (labeled as curr_node) where there is wrapping of addressed nodes but not the excluded addressed nodes, the x exclusion direction is negative, and the y exclusion direction is positive (e.g., when bc_end_x<bc_start_x<=quad_excl_x) is as follows:

Do not forward to NIU if:
curr_node>=bc_start_x&& curr_node<=quad_excl_x
Vector notation:
[quad_excl_x:bc_start_x]=disable forward to NIU In FIG. 23, the start coordinate is (6,1), the end coordinate is (3,3), the exclusion node is (1,2), the x exclusion direction is negative (e.g., a direction value of "0"), and the y exclusion direction is positive (e.g., a direction value of "1"). Based on this addressing of addressed nodes and excluded nodes for a multicast message, there is wrapping within the addressed nodes including the excluded nodes. The start column (labeled as bc_start_x) is column 6, the end column (labeled as bc_end_x) is column 3, and the column of the exclusion node (labeled as quad_excl_x) is column 1.

A logic and vector notation for forwarding to or between the exclusion nodes (labeled as curr_node) where there is wrapping of addressed nodes including the excluded addressed nodes, the x exclusion direction is negative, and the y exclusion direction is positive (e.g., when quad_excl_x<bc_end_x<bc_start_x) is as follows:

Do not forward to NIU if:

curr_node>=bc_start_x || curr_node<=quad_excl_x

Vector notation:

[quad_excl_x:0]=disable forward to NIU

[noc_last_x:bc_start_x]=disable forward to NIU

Figure 24:
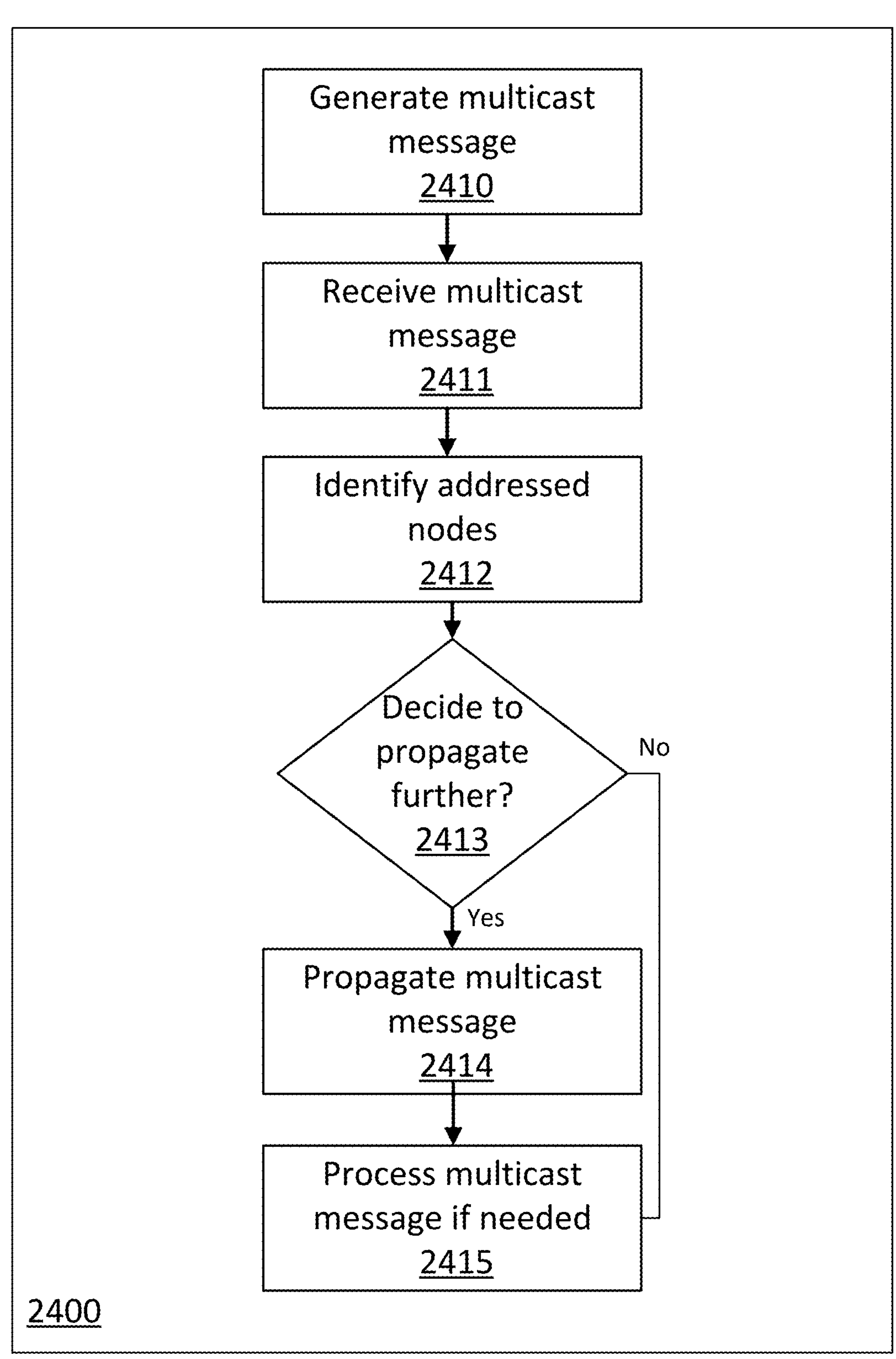
FIG. 24 shows a process for propagating multicast messages in accordance with specific embodiments of the inventions disclosed herein.

FIG. 24 shows a process 2400 for receiving and transmitting multicast messages according to specific embodiments of the invention. In step 2410, a multicast message can be optionally generated at an origin node. The message can have a payload, but can also include routing information in a header FLIT or another similar mechanism. NIUs within each node of the network can be configured with knowledge of the network topology and can calculate proper routing to send the message to its proper destination(s). This is true of a generating node as well, which can send the message to a connected node to efficiently propagate it. In step 2411, a current node can receive a message, either from a node origin or from an external source. In step 2412, the NIU portion of a node can determine the target nodes for propagation using routing information and identify the addressed nodes, as well as any excluded nodes within the addressed nodes space. This step may be explicit or implicit in how routing is accomplished in the NIU.

In step 2413, the NIU of the current node can decide whether to propagate the message along one or more of its connection paths. In some cases, there will be no need for further propagation, such as, for example, reaching the edge from inside an address node grid or else optimizing propagation to not propagate through excluded nodes. In other cases, the most efficient propagation path will continue through the current node; here, if the current node is not part of the set of addressed nodes, the message can continue to be forwarded toward a receiving node that can communicate with a node in the addressed space. The multicast message can be propagated along one or more connection paths in step 2414. Collectively, steps 2412-2414 correspond to a larger propagation step. Finally, in step 2415, the NIU of a node can examine if its node is part of the addressed nodes without being excluded, and the message can be forwarded to the processor core in the node. Each of the steps 2411-2415 can be repeated as each node receives the multicast message. Though the process is described as sequential, it can also be implemented in parallel; for example, a node can propagate a received message through multiple connection paths, and the associated nodes can act independently to forward the message and process them on their own.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

What is claimed is:

1. A method for multicasting within a network-on-chip ("NoC"), comprising:

receiving a multicast message at a first node of a network of nodes, wherein the multicast message includes a definition of one or more addressed nodes and one or more exclusion criteria;

propagating, via the first node, the multicast message to at least a first subset of the addressed nodes; and processing the multicast message at each node of the first subset of the addressed nodes;

wherein a second subset of the addressed nodes that does not process the multicast message is determined by the one or more exclusion criteria;

wherein each node of the second subset of nodes includes a network interface unit and a respective core; and wherein each of the network interface units of the second subset of the addressed nodes receives the multicast message but does not provide the multicast message to the respective core associated with the network interface unit.

2. The method of claim 1, wherein the definition of the one or more addressed nodes includes first information to determine a start node and an end node, wherein the start node and the end node define a grid of the addressed nodes, and wherein the multicast message propagates within the grid of the addressed nodes towards the end node.

3. The method of claim 2, wherein the one or more exclusion criteria include second information to identify the second subset of the addressed nodes.

4. The method of claim 3, wherein the second subset of nodes comprises a sub-grid within the grid of the addressed nodes.

5. The method of claim 2, wherein the grid comprises a rectangular grid and wherein the definition of the one or more addressed nodes comprises a start coordinate for the first node and an end coordinate for the end node, and wherein the end node is located at an opposite corner of the rectangular grid from the first node.

6. The method of claim 5, wherein the one or more exclusion criteria comprises an exclusion coordinate for an exclusion node within the grid, and wherein the exclusion node defines the second subset of the addressed nodes.

7. The method of claim 6, wherein the exclusion node is within the second subset of the addressed nodes.

8. The method of claim 6, wherein the second subset of the addressed nodes are configured in a rectangular sub-grid defined by the exclusion node and a corner of the rectangular grid.

9. The method of claim 8, wherein the corner of the rectangular grid is determined based on a y-exclusion direction and an x-exclusion direction of the one or more exclusion criteria.

10. The method of claim 8, wherein the one or more exclusion criteria further comprises a propagation exclusion optimization bit that reduces forwarding of the multicast message to the second subset of the addressed nodes.

11. The method of claim 8, wherein the rectangular grid and the rectangular sub-grid each wrap around within an address space of the network of nodes.

12. The method of claim 5, wherein the one or more exclusion criteria further comprises an identification of consecutive nodes within the rectangular grid as the second subset of the addressed nodes.

13. The method of claim 12, wherein the consecutive nodes comprise one or more rows within the rectangular grid or one or more columns within the rectangular grid.

14. The method of claim 13, wherein the identification of the consecutive nodes comprises nodes to skip for the processing of the multicast message.

15. The method of claim 13, wherein the identification of the consecutive nodes comprises nodes to keep for the processing of the multicast message.

16. The method of claim 1, wherein the definition of the one or more addressed nodes and the one or more exclusion criteria are located within a FLIT header of the multicast message.

17. The method of claim 1, wherein propagating, via the first node, the multicast message to at least a first subset of the addressed nodes comprises sending the multicast message through nodes not included in the addressed nodes.

18. A method for multicasting within a network-on-chip ("NoC"), comprising:

receiving a multicast message at a first node of a network of nodes, wherein the multicast message includes a definition of one or more addressed nodes and one or more exclusion criteria;

propagating, via the first node, the multicast message to at least a first subset of the addressed nodes; and processing the multicast message at each node of the first subset of the addressed nodes, wherein a second subset of the addressed nodes that does not process the multicast message is determined by the one or more exclusion criteria;

wherein the definition of the one or more addressed nodes includes first information to determine a start node and an end node;

wherein the start node and the end node define a grid of the addressed nodes;

wherein the multicast message propagates within the grid of the addressed nodes towards the end node;

wherein the grid comprises a rectangular grid;

wherein the definition of the one or more addressed nodes comprises a start coordinate for the first node and an end coordinate for the end node;

wherein the end node is located at an opposite corner of the rectangular grid from the first node;

wherein the one or more exclusion criteria further comprises an identification of consecutive nodes within the rectangular grid as the second subset of the addressed nodes;

wherein the consecutive nodes comprise one or more rows within the rectangular grid or one or more columns within the rectangular grid; and wherein the identification of the consecutive nodes comprises nodes to skip for the processing of the multicast message.

19. A method for multicasting within a network-on-chip ("NoC"), comprising:

receiving a multicast message at a first node of a network of nodes, wherein the multicast message includes a definition of one or more addressed nodes and one or more exclusion criteria;

propagating, via the first node, the multicast message to at least a first subset of the addressed nodes; and processing the multicast message at each node of the first subset of the addressed nodes, wherein a second subset of the addressed nodes that does not process the multicast message is determined by the one or more exclusion criteria;

wherein the definition of the one or more addressed nodes includes first information to determine a start node and an end node;

wherein the start node and the end node define a grid of the addressed nodes;

wherein the multicast message propagates within the grid of the addressed nodes towards the end node;

wherein the grid comprises a rectangular grid and wherein the definition of the one or more addressed nodes comprises a start coordinate for the first node and an end coordinate for the end node, and wherein the end node is located at an opposite corner of the rectangular grid from the first node;

wherein the one or more exclusion criteria further comprises an identification of consecutive nodes within the rectangular grid as the second subset of the addressed nodes;

wherein the consecutive nodes comprise one or more rows within the rectangular grid or one or more columns within the rectangular grid; and wherein the identification of the consecutive nodes comprises nodes to keep for the processing of the multicast message.

20. A method for multicasting within a network-on-chip ("NoC"), comprising:

receiving a multicast message at a first node of a network of nodes, wherein the multicast message includes a definition of one or more addressed nodes and one or more exclusion criteria;

propagating, via the first node, the multicast message to at least a first subset of the addressed nodes; and processing the multicast message at each node of the first subset of the addressed nodes, wherein a second subset of the addressed nodes that does not process the multicast message is determined by the one or more exclusion criteria;

wherein the definition of the one or more addressed nodes includes first information to determine a start node and an end node, wherein the start node and the end node define a grid of the addressed nodes, and wherein the multicast message propagates within the grid of the addressed nodes towards the end node;

wherein the grid comprises a rectangular grid;

wherein the definition of the one or more addressed nodes comprises a start coordinate for the first node and an end coordinate for the end node;

wherein the end node is located at an opposite corner of the rectangular grid from the first node; and wherein the one or more exclusion criteria comprises an exclusion coordinate for an exclusion node within the grid, and wherein the exclusion node defines the second subset of the addressed nodes.

21. The method of claim 20, wherein the exclusion node is within the second subset of the addressed nodes.

22. The method of claim 20, wherein the second subset of the addressed nodes are configured in a rectangular sub-grid defined by the exclusion node and a corner of the rectangular grid.

23. The method of claim 22, wherein the corner of the rectangular grid is determined based on a y-exclusion direction and an x-exclusion direction of the one or more exclusion criteria.

24. The method of claim 22, wherein the one or more exclusion criteria further comprises a propagation exclusion optimization bit that reduces forwarding of the multicast message to the second subset of the addressed nodes.

25. The method of claim 22, wherein the rectangular grid and the rectangular sub-grid each wrap around within an address space of the network of nodes.

* * * * *